United States Patent
Kamibayashi et al.

(10) Patent No.: US 12,117,418 B2
(45) Date of Patent: Oct. 15, 2024

(54) ULTRASONIC INSPECTION DEVICE AND INSPECTION METHOD

(71) Applicant: Mitsubishi Power, Ltd., Yokohama (JP)

(72) Inventors: Masakazu Kamibayashi, Tokyo (JP); Atsushi Sugiura, Tokyo (JP); Takuro Masuda, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 317 days.

(21) Appl. No.: 17/611,675

(22) PCT Filed: May 18, 2020

(86) PCT No.: PCT/JP2020/019663
§ 371 (c)(1),
(2) Date: Nov. 16, 2021

(87) PCT Pub. No.: WO2020/235529
PCT Pub. Date: Nov. 26, 2020

(65) Prior Publication Data
US 2022/0236232 A1     Jul. 28, 2022

(30) Foreign Application Priority Data
May 20, 2019  (JP) ................. 2019-094603

(51) Int. Cl.
*G01N 29/24* (2006.01)
*G01N 29/04* (2006.01)
(Continued)

(52) U.S. Cl.
CPC ............. *G01N 29/24* (2013.01); *G01N 29/04* (2013.01); *G01N 29/225* (2013.01);
(Continued)

(58) Field of Classification Search
CPC ...... G01N 29/24; G01N 29/04; G01N 29/225; G01N 29/265; G01N 29/30;
(Continued)

(56) References Cited

U.S. PATENT DOCUMENTS 6,098,022 A * 8/2000 Sonnichsen ......... G01M 13/028
702/56
10,365,249 B2 * 7/2019 Nagai .................... G01N 29/26
(Continued)

FOREIGN PATENT DOCUMENTS

| CN | 105637358 A | 6/2016 |
|---|---|---|
| CN | 107490623 A | 12/2017 |

(Continued)

OTHER PUBLICATIONS

Office Action dated May 5, 2022, issued in counterpart IN application No. 202117053159. (7 pages).
(Continued)

*Primary Examiner* — Francis C Gray
(74) *Attorney, Agent, or Firm* — WHDA, LLP

(57) ABSTRACT

An ultrasonic inspection device is an device for ultrasonically inspecting a rotor disc. The ultrasonic inspection device includes: an inspecting portion that has an ultrasonic probe for transmitting an ultrasonic wave to a disc surface of the rotor disc; a first magnet that movably holds the ultrasonic probe relative to the disc surface of the rotor disc; a drive wheel that causes the ultrasonic probe to move in a direction that intersects a radial direction of the rotor disc; a steering wheel that adjusts a moving direction of the drive wheel; a stroke sensor that detects the radial position of the ultrasonic probe being held relative to the disc surface; and a control device that controls the steering wheel on the basis
(Continued)

of information detected by the stroke sensor such that the radial position of the ultrasonic probe falls within a predetermined range.

17 Claims, 18 Drawing Sheets

(51) Int. Cl.
  *G01N 29/22* (2006.01)
  *G01N 29/265* (2006.01)
  *G01N 29/30* (2006.01)

(52) U.S. Cl.
  CPC ........... *G01N 29/265* (2013.01); *G01N 29/30* (2013.01); *G01N 2291/044* (2013.01); *G01N 2291/2694* (2013.01)

(58) Field of Classification Search
  CPC ..... G01N 2291/044; G01N 2291/2694; G01N 2291/0289; G01N 2291/2693; G01N 29/043
  See application file for complete search history.

(56) References Cited

U.S. PATENT DOCUMENTS

| | | | |
|---|---|---|---|
| 2012/0000290 A1 | 1/2012 | Boone et al. | |
| 2016/0231283 A1 | 8/2016 | Takemoto et al. | |
| 2017/0254785 A1* | 9/2017 | Urata | G10K 11/355 |
| 2017/0307569 A1* | 10/2017 | Tissenier | G01N 29/225 |
| 2017/0322185 A1 | 11/2017 | Davidson et al. | |
| 2018/0088085 A1 | 3/2018 | De Frutos-Galindo et al. | |
| 2021/0262985 A1* | 8/2021 | Fetzer | G01N 29/04 |

FOREIGN PATENT DOCUMENTS

| | | | | |
|---|---|---|---|---|
| CN | 111174894 A | * | 5/2020 | ............... G01H 5/00 |
| EP | 3 299 130 A1 | | 3/2018 | |
| JP | H03-026960 A | | 2/1991 | |
| JP | H08-338896 A | | 12/1996 | |
| JP | 3390748 B2 | | 3/2003 | |
| JP | 2009-186446 A | | 8/2009 | |
| JP | 2012-002586 A | | 1/2012 | |
| JP | 2012-098193 A | | 5/2012 | |
| JP | 2012-173259 A | | 9/2012 | |
| JP | 2013-529791 A | | 7/2013 | |
| JP | 2014-163805 A | | 9/2014 | |
| JP | 2016-017871 A | | 2/2016 | |
| JP | 2016-206049 A | | 12/2016 | |
| JP | 2017-191076 A | | 10/2017 | |
| JP | 2017-198663 A | | 11/2017 | |
| JP | 6470460 B1 | | 2/2019 | |

OTHER PUBLICATIONS

International Search Report dated Jun. 30, 2020, issued in counterpart Application No. PCT/JP2020/019663, with English Translation. (8 pages).
Written Opinion dated Jun. 30, 2020, issued in counterpart Application No. PCT/JP2020/019663, with English Translation. (8 pages).
Office Action dated Oct. 10, 2023, issued in counterpart CN application No. 202080035638.2, with English translation, (20 pages).

* cited by examiner

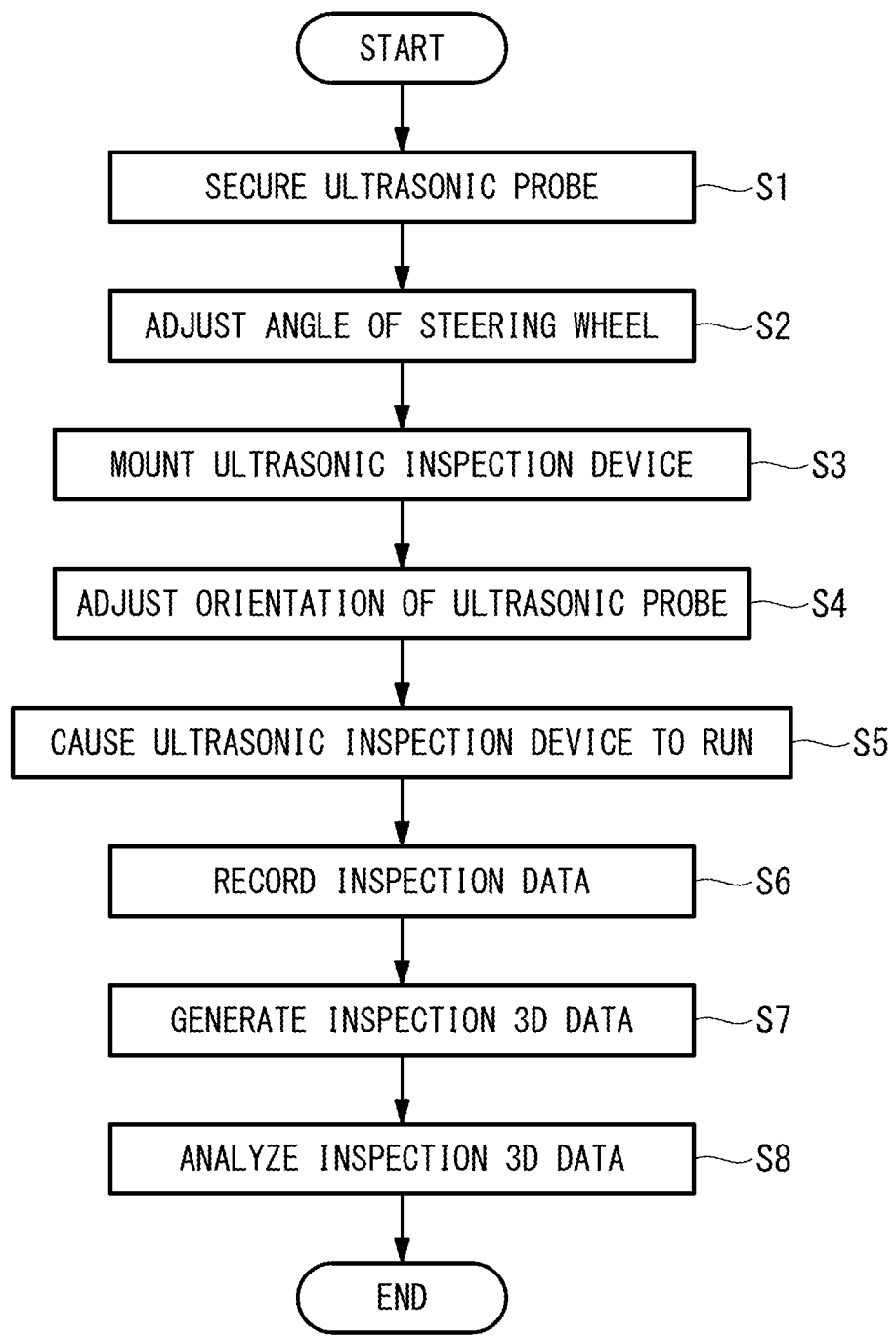

ULTRASONIC INSPECTION DEVICE AND INSPECTION METHOD

TECHNICAL FIELD

The present disclosure relates to an ultrasonic inspection device and an inspection method.

BACKGROUND ART

Turbine rotors of steam turbines in power plants are operated under high-temperature conditions. Therefore, SCC (stress corrosion cracking) may occur at sites that receive stresses when the turbine rotors are used for long periods of time. Since large stresses act on blade groove portions of rotor discs where blade root portions of moving blades are embedded, in particular, SCC is likely to occur. Non-destructive inspection of SCC occurring at the blade groove portions is thus conducted. As a method of the non-destructive inspection for the blade groove portions, an ultrasonic flaw detection method may satisfactorily be applied in terms of versatility and on-site workability.

Patent Literature 1 describes an ultrasonic inspection apparatus for ultrasonically inspecting a blade embedded portion of a rotor disc. The device includes a probe and a carriage for relatively moving the probe in a circumferential direction of the rotor disc along the rotor disc. The carriage includes a plurality of rotor disc traveling rollers for traveling on a disc surface of the rotor disc, a plurality of rotor shaft traveling rollers for traveling on a circumferential surface of a rotor shaft provided concentrically with the rotor disc, a holder assembly that includes a holder for holding the probe in a state in which the probe faces the disc surface, and at least one guide rail for guiding the holder in a radial direction of the rotor shaft.

CITATION LIST

Patent Literature

[PTL 1] Japanese Unexamined Patent Application, Publication No. 2016-206049

SUMMARY OF INVENTION

Technical Problem

A disc surface of a large-sized turbine rotor is provided with a flange such that a steam flow from a rotor blade is caused to efficiently flows toward a stationary blade (casing). Therefore, a portion where the flange projecting from the other regions serves as a narrow portion with a narrow gap from an adjacent disc. The device in Patent Literature 1 includes the carriage for causing the probe to move in the circumferential direction of the disc and is thus relatively large. Therefore, there is a probability that traveling of the probe in the circumferential direction becomes unstable at the narrow portion for some reasons such as an interference between the ultrasonic inspection device and the adjacent turbine rotor.

Also, in a case in which flaw detection is performed on the blade groove portion from the disc surface where the flange is provided in ultrasonic inspection, it is necessary to dispose the ultrasonic probe on the curved surface of the flange. According to the device in Patent Literature 1, the disposition on the curved surface of the flange is not taken into consideration, and there is thus a probability that the ultrasonic wave cannot effectively be incident because for example, it is not possible to physically dispose an device with the ultrasonic probe set thereon between discs of the turbine rotors, or because an air layer or the like is formed between the ultrasonic probe and the curved disc surface, in a case in which the flaw detection is performed on the blade groove portion from the curved surface of the flange of the disc surface.

Also, according to the device in Patent Literature 1, it is necessary to prepare a probe with an element alignment following the curved shape in accordance with the shape (curvature) of the curved portion or a wedge or the like that serves as an intermediate medium for causing an ultrasonic wave to be incident on the curved surface from elements typically smoothly aligned in order to cause ultrasonic waves to be focused on a blade groove range that serves as a flaw detection region when the flaw detection is performed from the curved disc surface in the ultrasonic inspection. Therefore, it is not possible to use the elements for several purposes, and preparation for the inspection may become complicated.

From such viewpoints, there is a probability that the device in Patent Literature 1 cannot suitably inspect the large-size turbine rotor in which the disc surface of the turbine rotor is curved.

The present disclosure was made in view of such circumstances, and an object thereof is to provide an ultrasonic inspection device and an inspection method capable of suitably inspecting a large-sized turbine rotor in which a disc surface of the turbine rotor is curved.

Solution to Problem

In order to solve the aforementioned problem, an ultrasonic inspection device and an inspection method according to the present disclosure employ the following means.

An ultrasonic inspection device according to a first aspect of the present disclosure is an ultrasonic inspection device for ultrasonically inspecting a rotor disc, the device including: an ultrasonic probe that transmits an ultrasonic wave to a disc surface of the rotor disc; a holding portion that movably holds the ultrasonic probe relative to the disc surface of the rotor disc; a moving portion that causes the ultrasonic probe to move in a direction that intersects a radial direction of the rotor disc; an adjustment portion that adjusts a moving direction of the moving portion; a position detecting portion that detects a radial position of the ultrasonic probe being held relative to the disc surface; and a control portion that controls the adjustment portion on the basis of information detected by the position detecting portion such that the radial position of the ultrasonic probe fails within a predetermined range.

In the aforementioned configuration, the ultrasonic probe is movably held relative to the disc surface of the rotor disc, and the ultrasonic probe is moved by the moving portion. In this manner, the ultrasonic inspection device travels on the disc surface of the rotor disc. Also, in the aforementioned configuration, the control portion controls the adjustment portion such that the radial position of the ultrasonic probe falls within the predetermined range. It is thus possible to cause the radial position of the ultrasonic probe to fall within the predetermined direction when the ultrasonic probe moves in the direction that intersects the radial direction of the rotor disc. In other words, it is possible to cause the ultrasonic probe to move in the circumferential direction while maintaining the predetermined radial position.

In this manner, in the aforementioned configuration, the ultrasonic inspection device can travel in the circumferential direction on the disc surface of the rotor disc. As compared with a configuration in which a carriage and the like secured to a rotor shaft, for example, is provided to fix the radial position of the ultrasonic probe, the ultrasonic inspection device can be reduced in size by not being provided with the carriage and the like. It is thus possible to easily mount the ultrasonic inspection device on the disc surface of the rotor disc even in a case of a rotor disc at a short distance from an adjacent rotor disc, like a large-sized rotor disc, for example.

Also, the ultrasonic inspection device according to the first aspect of the present disclosure may include a drive portion that drives the moving portion.

In the aforementioned configuration, the ultrasonic inspection device includes the drive portion that drives the moving portion. In this manner, there is no need to obtain power from outside, and the ultrasonic inspection device can travel by itself on the disc surface of the rotor disc. Therefore, wiring of a power line is not needed, and it is possible to secure a degree of freedom in movement of the ultrasonic inspection device, as compared with a structure in which the ultrasonic inspection device obtains power from the outside.

Also, since the ultrasonic inspection device travels by itself, and there is no need for an operator to manually move the ultrasonic inspection device, it is also possible to apply the ultrasonic inspection device to inspection of a large-sized rotor disc that some portion of which is difficult for the operator to reach.

In addition, the ultrasonic inspection device according to the first aspect of the present disclosure may include a magnet that sticks to the disc surface, and the magnet may be separated from the disc surface.

In the aforementioned configuration, the magnet is separated from the disc surface. It is thus possible to reduce a traveling resistance when the ultrasonic inspection device moves.

Moreover, the ultrasonic inspection device according to the first aspect of the present disclosure may include a moving distance detecting portion that detects a distance of the movement caused by the moving portion.

The aforementioned configuration includes the moving distance detecting portion that detects the distance of the movement. It is thus possible to grasp the position of the ultrasonic inspection device in the circumferential direction. Therefore, it is possible to associate an inspection result of the ultrasonic probe and the position in the circumferential direction. Accordingly, it is possible to specify the position of a damage that has occurred in the rotor disc.

An ultrasonic inspection device according to a second aspect of the present disclosure is an ultrasonic inspection device for ultrasonically inspecting a rotor disc, the device including: an ultrasonic probe that transmits an ultrasonic wave to a disc surface of the rotor disc; a probe-side holder to which the ultrasonic probe is secured; a deformation portion that is provided between the ultrasonic probe and the disc surface, allows the ultrasonic wave to pass therethrough, and is deformable by being pressed against the disc surface; a rotor disc-side holder that includes a sticking portion sticking to the disc surface, is provided closer to the rotor disc than the probe-side holder, and holds the deformation portion; and a biasing portion that biases the probe-side holder toward the rotor disc.

The aforementioned configuration includes the deformation portion that is deformed by being pressed against the rotor disc between the ultrasonic probe and the rotor disc. In this manner, the deformation portion is deformed in accordance with the surface of the rotor disc by the deformation portion being pressed against the rotor disc, an air layer between the ultrasonic probe and the rotor disc is thus removed, and it is possible to suitably deliver the ultrasonic wave from the ultrasonic probe to the rotor disc. Therefore, it is also possible to suitably inspect a rotor disc with a curved disc surface such as a large-sized rotor disc, for example, by causing the deformation portion to be deformed.

Also, in the aforementioned configuration, the deformation portion changes in accordance with the curved form of the disc surface, and it is thus possible to remove the air layer in any curved form. Therefore, the curved form of the disc surface that is an inspection target may change in accordance with movement in a case in which the ultrasonic inspection device moves, for example. Even in such a case, the deformation portion changes in accordance with a change in curved form of the disc surface. Therefore, it is possible to suitably perform inspection while causing the ultrasonic inspection device to move.

Also, in the aforementioned configuration, the probe-side holder is biased toward the rotor disc by the biasing portion. In this manner, it is possible to press the deformation portion against the rotor disc via the probe-side holder. Therefore, it is possible to more suitably press the deformation portion against the rotor disc. Accordingly, it is possible to more suitably cause the deformation portion to be deformed in accordance with the disc surface of the rotor disc and to remove the air layer.

Also, the ultrasonic inspection device according to the second aspect of the present disclosure may further include an angle adjustment portion that changes an angle of the ultrasonic probe relative to the disc surface.

The aforementioned configuration includes the angle adjustment portion that changes the angle of the ultrasonic probe relative to the disc surface of the rotor disc. It is thus possible to appropriately transmit the ultrasonic wave to a target location (inspection target location) through the adjustment of the angle of the ultrasonic probe.

An ultrasonic inspection device according to a third aspect of the present disclosure is an ultrasonic inspection device for ultrasonically inspecting a rotor disc, the device including: a first ultrasonic probe that transmits an ultrasonic wave to a disc surface of the rotor disc; a second ultrasonic probe that transmits the ultrasonic wave to the disc surface and is provided to be adjacent to the first ultrasonic probe; a first inclination means that causes the first ultrasonic probe to be inclined on an opposite side of the second ultrasonic probe; and a second inclination means that causes the second ultrasonic probe to be inclined on an opposite side of the first ultrasonic probe.

The aforementioned configuration includes the first inclination means that causes the first ultrasonic probe to be inclined on the opposite side of the second ultrasonic probe and the second inclination means that causes the second ultrasonic probe to be inclined on the opposite side of the first ultrasonic probe. It is thus possible to cause an ultrasonic wave transmitted from the first ultrasonic probe and an ultrasonic wave transmitted from the second ultrasonic probe to be focused inside the rotor disc by transmitting the ultrasonic waves from the first ultrasonic probe and the second ultrasonic probe in the state in which the first ultrasonic probe and the second ultrasonic probe are inclined. Also, it is possible to adjust the depth of the focusing position of the ultrasonic waves (the distance from the disc surface of the rotor disc) through the adjustment of the inclination angles. Therefore, it is possible to cause the ultrasonic waves to be focused at a desired position through the adjustment of the first ultrasonic probe and the second ultrasonic probe in accordance with the shape of the curved portion even in a case of a turbine with a curved disc surface such as a large-sized rotor disc, for example. Accordingly, it is possible to easily perform inspection because there is no need to prepare an element and the like with a refraction angle calculated in accordance with the shape (curvature) of the curved portion.

Also, it is possible to locate the focusing position of the ultrasonic waves on the first ultrasonic probe or on the second ultrasonic probe by setting the inclination angle of the first ultrasonic probe and the inclination angle of the second ultrasonic probe to be different inclination angles. In other words, in a case in which the inclination angle of the first ultrasonic probe is set to be larger than the inclination angle of the second ultrasonic probe, the focusing position of the ultrasonic waves is located on the second ultrasonic probe. On the contrary, in a case in which the inclination angle of the second ultrasonic probe is set to be larger than the inclination angle of the first ultrasonic probe, the focusing position of the ultrasonic waves is located on the first ultrasonic probe. It is thus possible to cause the ultrasonic waves to be focused in a wider range.

An inspection method according to a first aspect of the present disclosure is an inspection method for ultrasonically inspecting a rotor disc using the ultrasonic inspection device according to the aforementioned first aspect, the method including: an ultrasonic wave transmission process of transmitting an ultrasonic wave from the ultrasonic probe to the disc surface of the rotor disc; a holding process of movably holding the ultrasonic probe relative to the disc surface, by the holding portion; a moving process of causing the ultrasonic probe to move in a direction that intersects the radial direction of the rotor disc, by the moving portion; an adjustment process of adjusting a moving direction of the moving portion, by the adjustment portion; a position detecting process of detecting a radial position of the ultrasonic probe being held relative to the disc surface, by the position detecting portion; and a control process of controlling the adjustment portion on the basis of information detected in the position detecting process, by the control portion such that the radial position of the ultrasonic probe fails within a predetermined range.

In the aforementioned configuration, it is possible to inspect the rotor disc while causing the ultrasonic inspection device to travel in the circumferential direction on the disc surface of the rotor disc. It is thus possible to reduce the size of the ultrasonic inspection device corresponding to non-provision of a carriage and the like as compared with a configuration in which the radial position of the ultrasonic probe is fixed, by providing the carriage and the like secured to a rotor shaft, for example. It is thus possible to easily mount the ultrasonic inspection device on the disc surface of the rotor disc and to easily perform the inspection even in a case of a rotor disc at a short distance from an adjacent rotor disc, like a large-sized rotor disc, for example.

In the inspection method according to the first aspect of the present disclosure, in the holding process, the ultrasonic probe may be held relative to a curved surface of the disc surface.

In the aforementioned configuration, it is possible to cause the ultrasonic probe to be held on the curved surface of the rotor disc.

Also, the inspection method according to the first aspect of the present disclosure may include: a recording process of recording inspection data obtained by the ultrasonic wave transmitted from the ultrasonic probe; and a determination process of determining whether or not the rotor disc has been damaged on the basis of the inspection data recorded in the recording process.

In the aforementioned configuration, it is possible to suitably determine whether or not the rotor disc has been damaged.

Advantageous Effects of Invention

It is possible to suitably inspect a large-sized turbine rotor in which a disc surface of the turbine rotor is curved.

BRIEF DESCRIPTION OF DRAWINGS

FIG. 18 is a flowchart illustrating an inspection method according to the embodiment of the present disclosure.

DESCRIPTION OF EMBODIMENTS

Hereinafter, an embodiment of an ultrasonic inspection device and an inspection method according to the present disclosure will be described with reference to the drawings. Note that in the following description, the radial direction of a rotor disc will also be referred to as an X direction, the plate thickness direction of the rotor disc will also be referred to as a Y direction, and a tangential direction of the rotor disc (the direction that perpendicularly intersects the X direction and the Y direction) will also be referred to as a Z direction.

Figure 1:
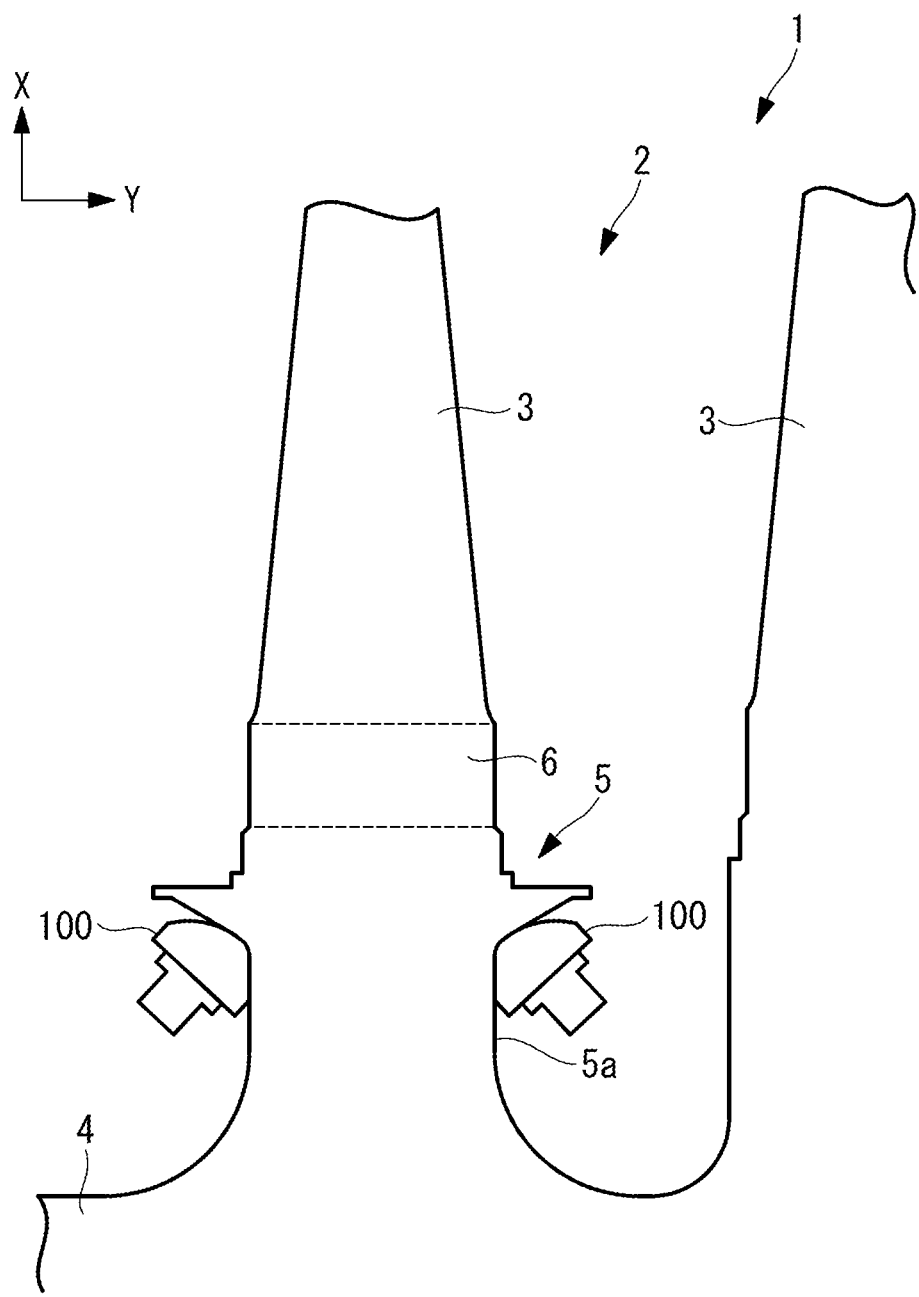
FIG. 1 is a vertical sectional view of a turbine rotor and a rotor blade according to an embodiment of the present disclosure.

FIG. 1 is a vertical sectional view of a steam turbine. As illustrated in FIG. 1, a steam turbine 1 includes a turbine rotor 2 and a moving blade 3 secured to the turbine rotor 2. The turbine rotor 2 includes a rotor shaft 4 and a plurality of rotor discs 5 provided concentrically with the rotor shaft 4. The rotor discs 5 include a plurality of blade groove portions 6 with outer circumferential portions to which the moving blade 3 is fitted, as illustrated in FIG. 2.

An ultrasonic inspection device 100 according to the present embodiment is an device that is attached to a disc surface 5a of each rotor disc 5 to ultrasonically inspect the blade groove portion 6 as illustrated in FIG. 1. Specifically, the ultrasonic inspection device 100 is an device that inspects whether or not a damage such as SCC (stress corrosion cracking) has occurred in the blade groove portion 6 by transmitting an ultrasonic wave toward the blade groove portion 6. In the present embodiment, an example in which a large-sized rotor disc 5 is defined as an inspection target from among the plurality of rotor discs 5 will be described.

As illustrate in FIG. 1, the disc surface 5a of the large-sized rotor disc 5 is not a flat surface. Specifically, the disc surface 5a is curved in the radius direction of the rotor disc 5, is also curved in the circumferential direction of the rotor disc 5, and has a two-dimensional curved surface shape. A simple expression of the "radial direction" in the following description means the radial direction of the rotor disc 5. Also, a simple expression of the "circumferential direction" means the circumferential direction of the rotor disc 5. Moreover, the curve of the disc surface 5a in the radial direction will also be referred to as a "small diameter R", and the curve in the circumferential direction will also be referred to as a "large diameter R".

Figure 2:
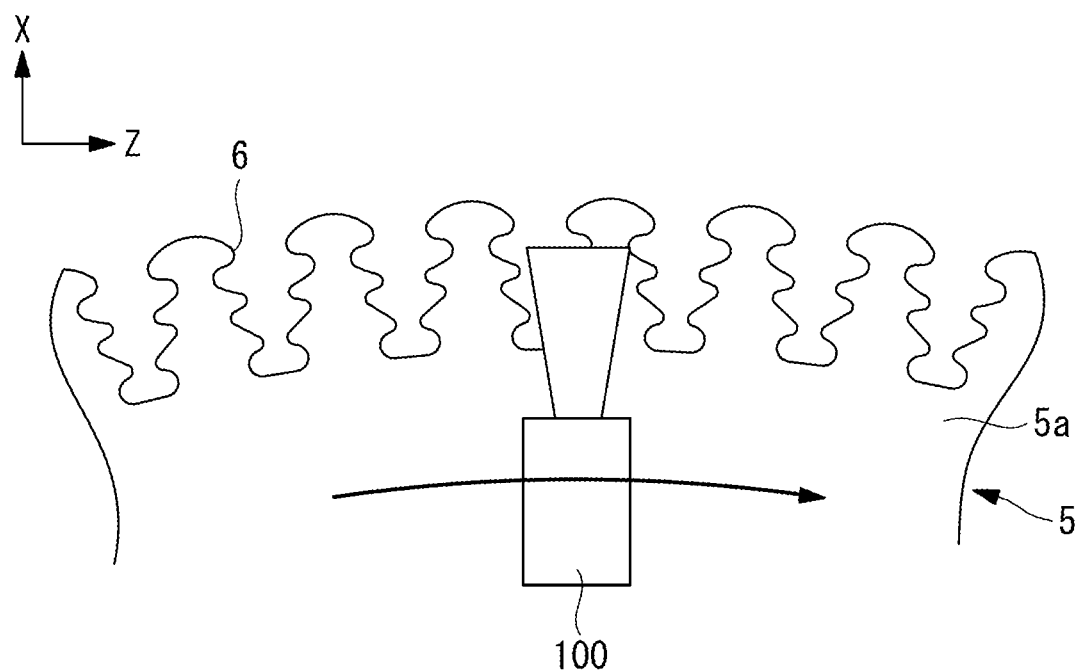
FIG. 2 is a view of a disc surface of a rotor disc according to the embodiment of the present disclosure when seen from a front side.

As illustrated in FIG. 2, each blade groove portion 6 formed in the rotor disc 5 is a groove recessed from an outer circumferential surface of the rotor disc 5 and is a so-called side entry-type groove extending from the disc surface 5a on one side toward the disc surface 5a on the other side of the rotor disc 5. Such a side entry-type groove requires identification between intermittent shape reflection echoes and cracking reflection echoes appearing in accordance with groove pitches worked in the circumferential direction, it is more difficult to perform inspection as compared with a groove extending in the circumferential direction.

Figure 3:
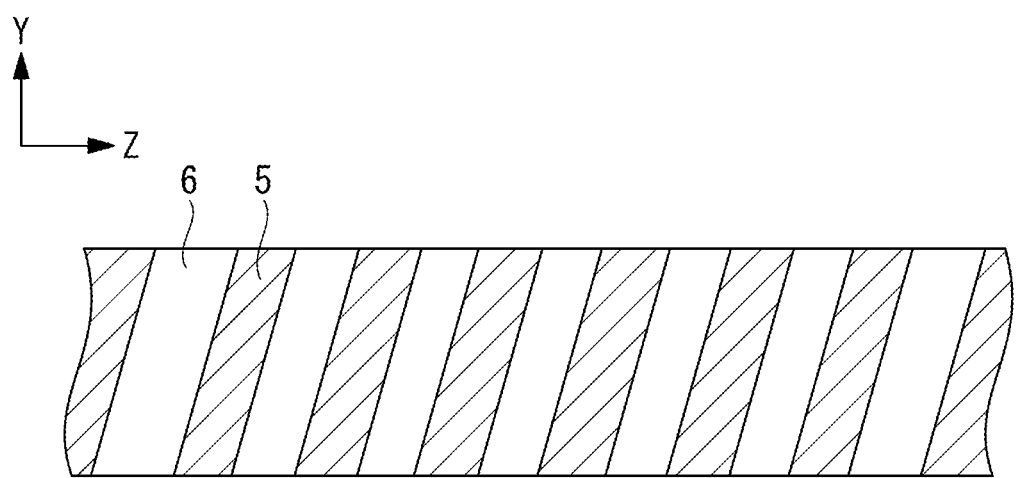
FIG. 3 is a top view of the rotor disc according to the embodiment of the present disclosure.

Also, each blade groove portion 6 is a so-called skewed-type groove formed such that a linear groove is inclined relative to the plate thickness direction as illustrated in FIG. 3. The plurality of blade groove portions 6 are formed to be aligned at predetermined intervals in the circumferential direction. The moving blade 3 is a side entry-type moving blade including a blade root portion with a so-called Christmas tree shape.

Note that the shape of each blade groove portion 6 is not limited to the shape in the above description. For example, each blade groove portion 6 may be formed to be curved along the plate thickness direction (Y direction) or may be formed in parallel with the plate thickness direction (Y direction).

The ultrasonic inspection device 100 is attached to the curved surface which is closer to the rotor shaft 4 than a projecting portion formed between the blade groove portion 6 and the rotor shaft 4 and projecting from the disc surface 5a, as illustrated in FIG. 1. Also, the ultrasonic inspection device 100 moves on the disc surface 5a of the rotor disc 5 in the circumferential direction of the rotor disc 5 as illustrated in FIG. 2 as will be described later in detail (see the arrow in FIG. 2).

[Ultrasonic Inspection Device]

Next, details of the ultrasonic inspection device 100 will be described using FIGS. 4 to 8.

Figure 4:
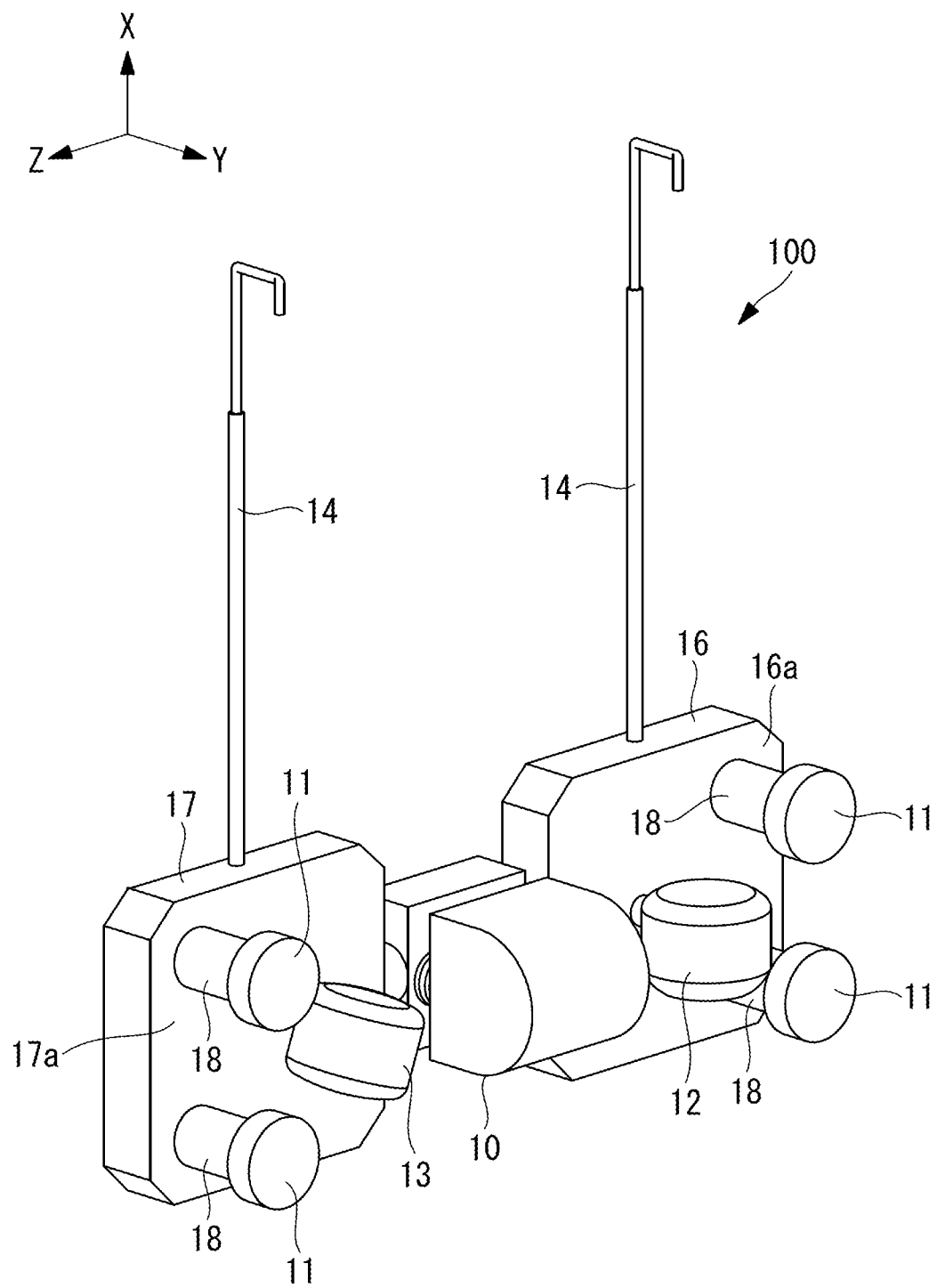
FIG. 4 is a schematic perspective view of an ultrasonic inspection device according to the embodiment of the present disclosure.
Figure 5:
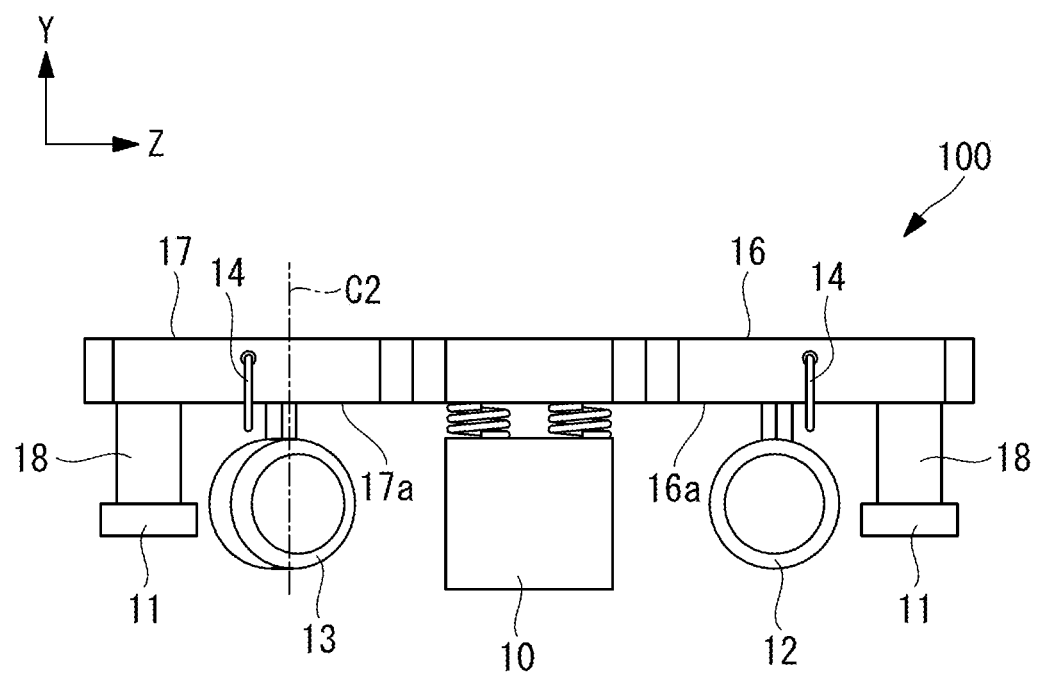
FIG. 5 is a side view of the ultrasonic inspection device in FIG. 4.

The ultrasonic inspection device 100 includes an inspecting portion 10 that transmits an ultrasonic wave, a plurality of first magnets (holding portions) 11 that movably hold the inspecting portion 10 relative to the disc surface 5a of the rotor disc 5, a drive wheel (moving portion) 12 that causes the inspecting portion 10 to move in a direction that intersects the radial direction of the rotor disc 5, a steering wheel (adjustment portion) 13 that adjusts a traveling direction of the drive wheel 12, two stroke sensors (position detecting portions) 14 that detect the position of the inspecting portion 10, which is held relative to the disc surface 5a, in the radial direction, and a control device (control portion) 15 that controls the steering wheel 13 on the basis of information detected by the stroke sensor 14, as illustrated in FIGS. 4 and 5. The ultrasonic inspection device 100 detects data (UT data) in the entire region in the circumferential direction of the rotor disc 5 using the inspecting portion 10 while traveling on the rotor disc 5 in the circumferential direction using the drive wheel 12 and the like.

Also, the ultrasonic inspection device 100 includes a drive wheel support portion 16 that supports the drive wheel 12 and a steering wheel support portion 17 that supports the steering wheel 13. The drive wheel support portion 16 and the steering wheel support portion 17 are plate-shaped members and are provided such that plate surfaces face the disc surface 5a of the rotor disc 5. Hereinafter, the plate surfaces of the drive wheel support portion 16 and the steering wheel support portion 17 facing the disc surface 5a will be referred to as facing surfaces 16a and 17a.

Figure 6:
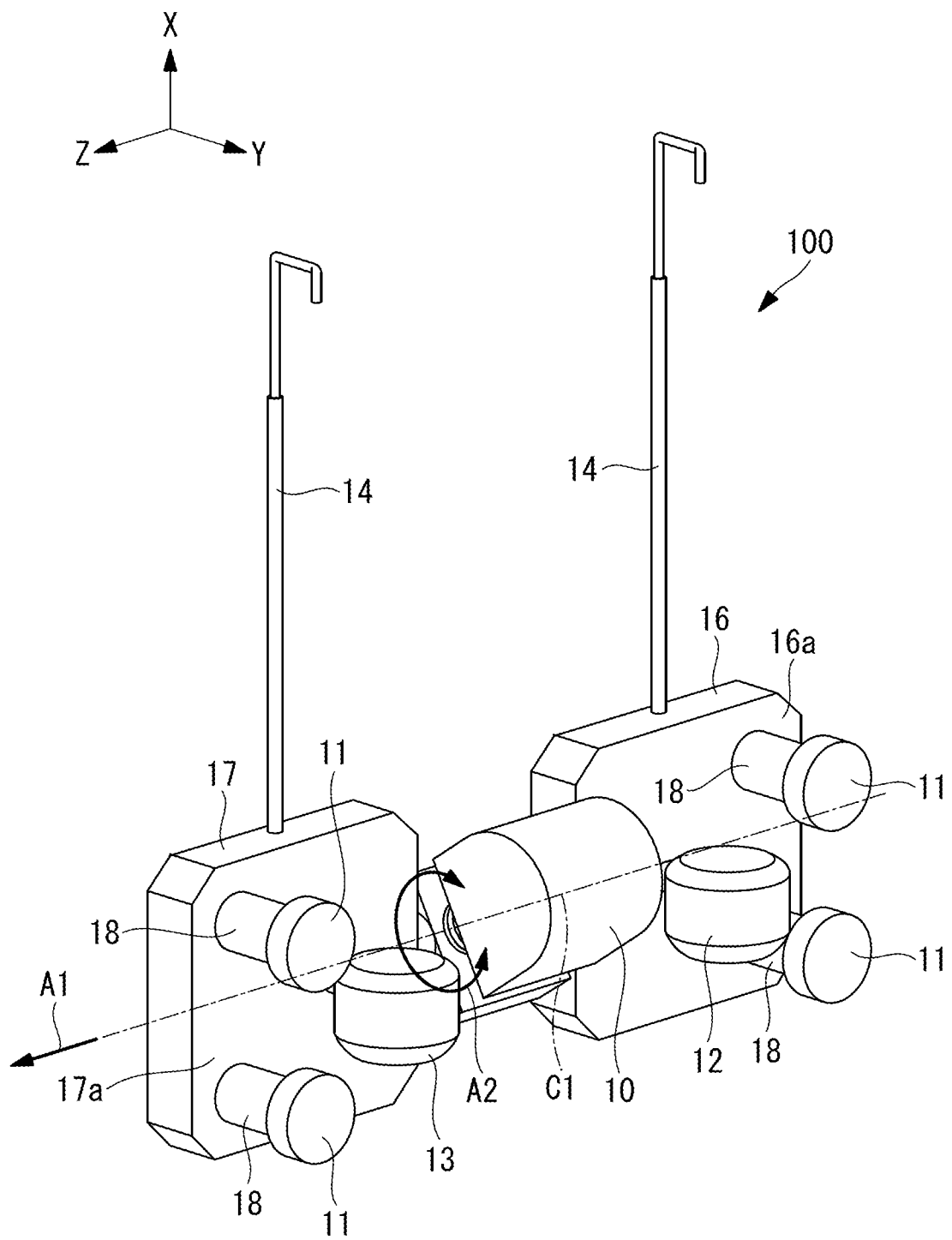
FIG. 6 is a perspective view of the ultrasonic inspection device according to the embodiment of the present disclosure.

The inspecting portion 10 includes an ultrasonic probe 31 that transmits and receives ultrasonic waves to and from the disc surface 5a of the rotor disc 5. The inspecting portion 10 acquires UT data obtained by the ultrasonic probe 31 and transmits the UT data to the control device 15. The inspecting portion 10 is provided between the drive wheel support portion 16 and the steering wheel support portion 17. As illustrated in FIG. 6, the inspecting portion 10 is adapted to be rotatable in a roll direction (see the arrow A2 in FIG. 6) relative to the drive wheel support portion 16 and the steering wheel support portion 17. The roll direction is a rotational direction with the traveling direction (see the arrow A1 in FIG. 6) of the ultrasonic inspection device 100 defined as a central axis line C1. A specific structure of the inspecting portion 10 will be described later.

Two first magnets 11 are provided at the drive wheel support portion 16, and the two first magnets 11 are disposed to be aligned in the radial direction. In addition, two first magnets 11 are also provided at the steering wheel support portion 17, and the two first magnets 11 are disposed to be aligned in the radial direction. Each first magnet 11 is secured to the facing surfaces 16a and 17a of the drive wheel support portion 16 and the steering wheel support portion 17. Each first magnet 11 is provided to project in the direction of the rotor disc 5 from the facing surfaces 16a and 17a. The four first magnets 11 hold the ultrasonic inspection device 100 on the disc surface 5a by sticking to the disc surface 5a of the rotor disc 5 with a magnetic force. However, the four first magnets 11 are disposed to be separated from the disc surface 5a. This is because the drive wheel 12 and the steering wheel 13 project more toward the rotor disc than the first magnets 11 (see FIG. 5).

Figure 7:
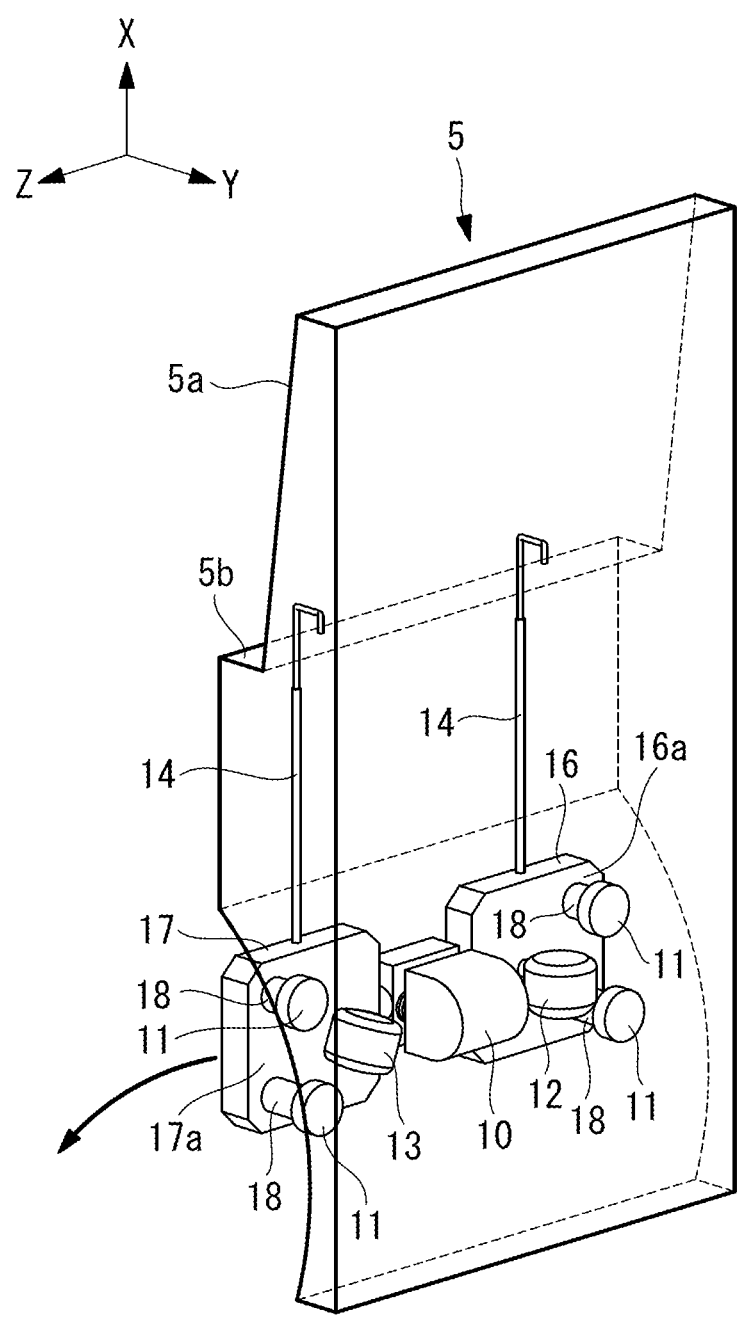
FIG. 7 is a perspective view of the ultrasonic inspection device according to the embodiment of the present disclosure and is a diagram illustrating a state in which the ultrasonic inspection device is mounted on the rotor disc.

The length of each first magnet 11 projecting from the facing surfaces 16a and 17a is adjusted by the stroke control device 18. As illustrated in FIG. 7, the distances between the first magnets 11 and the disc surface 5a become constant by the stroke control device 13 setting the projecting length of each first magnet 11 to a length in accordance with the curved surface at the time of the sticking to the curved surface. The first magnets 11 can thus suitably attract the disc surface 5a. Note that the stroke control device 18 is not essential and the magnet placement position may be set in advance on the basis of drawing information such that the distances between the first magnets 11 and the disc surface 5a become constant.

The drive wheel 12 is provided at the facing surface 16a of the drive wheel support portion 16. The drive wheel 12 is disposed to come into contact with the disc surface 5a of the rotor disc 5. The drive wheel 12 is driven and rotated by a drive force from a motor (not illustrated). Note that the motor may be incorporated in the drive wheel 12 or may be provided outside the drive wheel 12. The ultrasonic inspection device 100 travels on the disc surface 5a by the drive wheel 12 being driven and rotated. An encoder (moving distance detecting portion) is incorporated in the drive wheel 12. The encoder detects the amount of movement of the drive wheel 12. The encoder transmits the detected information to the control device 15.

The steering wheel 13 is provided at the facing surface 17a of the steering wheel support portion 17. The steering wheel 13 is disposed to come into contact with the disc surface 5a of the rotor disc 5. The steering wheel 13 is supported by the steering wheel support portion 17 such that the steering wheel 13 is rotatable about a central axis line C2 that perpendicularly intersects the facing surface 17a. The traveling direction of the ultrasonic inspection device 100 is adjusted by causing the steering wheel 13 to rotate about the central axis line C2.

One stroke sensor 14 is provided at each of the drive wheel support portion 16 and the steering wheel support portion 17. The stroke sensor 14 detects the distance between a reference portion of the rotor disc 5 in the radial direction and the ultrasonic inspection device 100. The stroke sensor 14 transmits the detected information to the control device 15. In the example in FIG. 7, a shoulder portion 5b projecting from the disc surface 5a is applied as the reference portion in the radial direction. Specifically, the reference position is grasped by hooking a hook portion provided at a distal end of each stroke sensor 14 on the shoulder portion 5b. Note that the reference portion may not be the shoulder portion 5b. The reference portion may be any portion that can serve as a reference in the radial direction, and for example, an outer circumferential surface of the rotor shaft 4 may be used as the reference portion.

The control device 15 is configured with, for example, a central processing unit (CPU), a random access memory (RAM), a read only memory (ROM), a computer-readable storage medium, and the like. Also, a series of processes to realize various functions are stored in the storage medium or the like in the form of a program in one example, and the various functions are realized by the CPU reading the program on the RAM or the like and executing information processing and arithmetic operations. Note that a mode in which the program is installed in advance in the ROM or another storage medium, a mode in which the program is provided in a state where the program is stored in a computer-readable storage medium, a mode in which the program is distributed via a wired or wireless communication means, or the like may be employed. The computer-readable storage medium is a magnetic disk, a magneto-optical disc, a CD-ROM, a DVD-ROM, a semiconductor memory, or the like.

Figure 8:
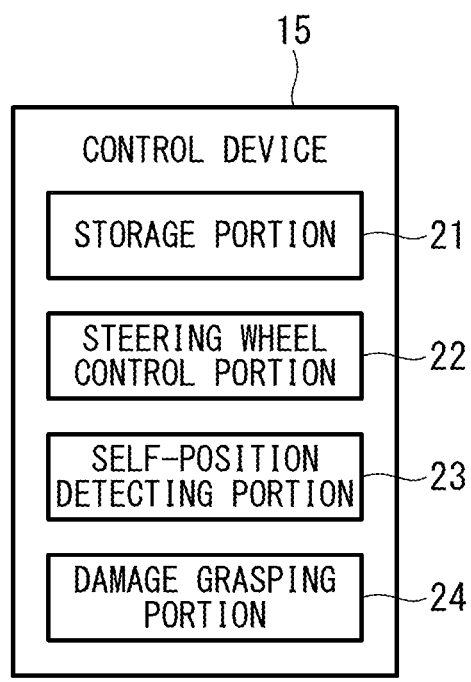
FIG. 8 is a block diagram of a control device according to the embodiment of the present disclosure.

The control device 15 includes a storage portion 21 that stores a value (initial value) of the distance between the ultrasonic inspection device 100 and the shoulder portion (reference portion) when the ultrasonic inspection device 100 is mounted on the disc surface 5a, a steering wheel control portion 22 that controls an orientation of the steering wheel 13 on the basis of information detected by the stroke sensor 14 such that the radial position of the ultrasonic inspection device 100 falls within a predetermined range, a self-position detecting portion (moving distance detecting portion) 23 that detects the self-position on the basis of information from the encoder, and a damage grasping portion 24 that grasps a damage of the rotor disc 5, as illustrated in FIG. 8.

The steering wheel control portion 22 controls the angle by which the steering wheel 13 rotates such that the distance between the ultrasonic inspection device 100 and the shoulder portion (reference portion) becomes the initial value, on the basis of the initial value stored in the storage portion 21 and the information detected by the stroke sensor 14. It is possible to travel in the circumferential direction while maintaining the predetermined radial position through such control of the steering wheel 13.

The self-position detecting portion 23 calculates the traveling distance on the basis of information from the encoder and detects the self-position of the ultrasonic inspection device 100 in the circumferential direction.

The damage grasping portion 24 records the UT data on the rotor disc 5 detected by the inspecting portion 10 and the information regarding the self-position from the encoder in a temporally synchronous manner. In ether words, the UT data and the position in the circumferential direction where the UT data has been obtained are linked. It is thus possible to grasp what kind of damage has occurred and which part of the rotor disc 5 the damage has occurred.

[Inspecting Portion]

Next, details of the inspecting portion 10 will be described using FIGS. 9 to 13. Note that although FIGS. 4 to 7 schematically illustrate the structure of coupling of the inspecting portion 10 to the steering wheel support portion 17 and the drive wheel support portion 16, the inspecting portion 10 is coupled to the steering wheel support portion 17 and the drive wheel support portion 16 with securing arms 30 illustrated in FIGS. 9 to 13. Also, in the following description, a direction on the side of the rotor disc 5 will be referred to as one direction, and the opposite direction of the one direction will be referred to as the other direction. Moreover, an end portion on the side of the one direction will be referred to as one end portion, and an end portion on the side of the other direction will be referred to as the other end portion.

Figure 9:
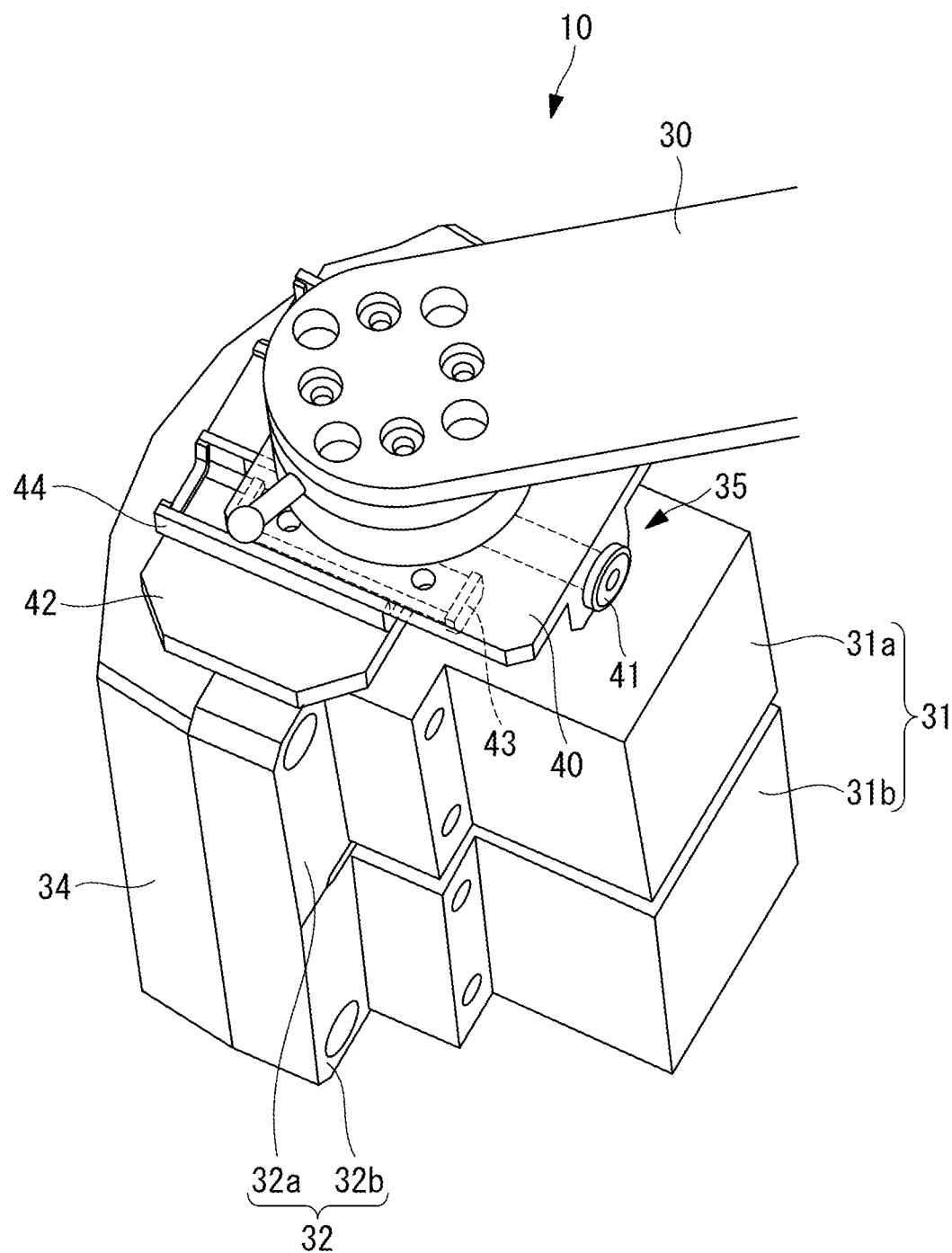
FIG. 9 is a perspective view of an inspecting portion according to the embodiment of the present disclosure.

The inspecting portion 10 includes two ultrasonic probes 31 that transmit ultrasonic waves to the disc surface 5a of the rotor disc 5, a probe-side holder 32 to which the ultrasonic probes 31 are secured, a soft gel portion (deformation portion) 33 provided between the ultrasonic probes 31 and the disc surface 5a, a rotor disc-side holder 34 that is provided on the side of the rotor disc 5 beyond the probe-side holder 32 and holds the soft gel portion 33, a biasing portion 35 that biases the probe-side holder 32 toward the rotor disc 5, and an angle adjustment portion 36 that changes angles of the ultrasonic probes 31 relative to the disc surface 5a, as illustrated in FIG. 9.

Each ultrasonic probe 31 is a device that transmits an ultrasonic wave to the rotor disc 5. Each of the two ultrasonic probes 31 is secured to the probe-side holder 32 via an inclination adjustment mechanism 50. Details of the inclination mechanism will be described later. The two ultrasonic probes 31 are disposed in an aligned manner. Specifically, the ultrasonic probes 31 are disposed in an aligned manner in a direction (Z direction) that intersects the radial direction when the ultrasonic inspection device 100 is mounted on the rotor disc 5. In the following description, one of the ultrasonic probes 31 will be described as a first ultrasonic probe 31a while the other ultrasonic probe 31 will be referred to as a second ultrasonic probe 31b.

The probe-side holder 32 is connected to a pair of securing arms 30. The probe-side holder 32 is coupled to the drive wheel support portion 16 and the steering wheel support portion 17 via the pair of securing arms 30. The probe-side holder 32 and the securing arms 30 are connected via the angle adjustment portion 36 and a rotation securing portion. The angle adjustment portion 36 and the rotation securing portion will be described later.

Figure 12:
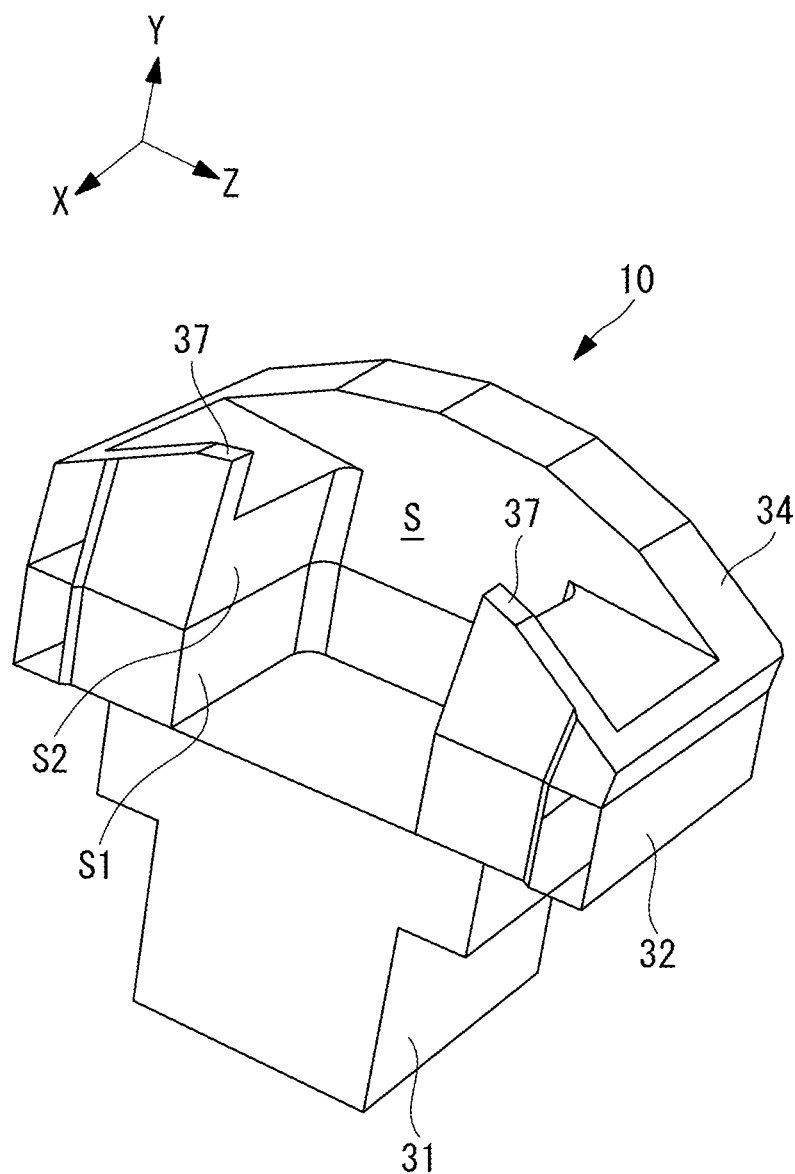
FIG. 12 is a perspective view illustrating a section of the inspecting portion according to the embodiment of the present disclosure.

The probe-side holder 32 includes a first probe-side holder 32a with the other end portion to which the first ultrasonic probe 31a is secured and a second probe-side holder 32b with the other end to which the second ultrasonic probe 32b is secured. The first probe-side holder 32a and the second probe-side holder 32b have shapes obtained by symmetrically splitting a rectangular frame with reference to a central axis line of the frame. In other words, the first probe-side holder 32a and the second probe-side holder 32b constitute a frame with a substantially rectangular shape with a space S1 formed at the center as illustrated in FIG. 12 by the end portions thereof being brought into contact with each other. The space S1 is filled with the soft gel portion 33 (see FIG. 13). One end portion of the probe-side holder 32 forms a plane and abuts on the other end portion of the rotor disc-side holder 34. The two ultrasonic probes 31 are secured to the other end portion of the probe-side holder 32. Hereinafter, the first probe-side holder 32a and the second probe-side holder 32b will be simply referred to as a probe-side holder 32 in a case in which it is not necessary to describe them in a separated manner.

The rotor disc-side holder 34 is provided closer to the rotor disc 5 than the probe-side holder 32. One end portion of the rotor disc-side holder 34 forms a curved surface corresponding to a small diameter R. Also, the other end portion of the rotor disc-side holder 34 forms a plane and abuts on the one end portion of the probe-side holder 32. In addition, the rotor disc-side holder 34 has a rectangular frame shape and includes a space S2 formed at the center. The length of the space S2 in the Z direction is longer on one side than that on the other side as illustrated in FIG. 12. The space S2 is formed over the entire range of the rotor disc-side holder 34 in the Z direction at the end portion on one side and is split in the X direction by the shielding plate 37. The space S2 communicates with the space S1 formed at the center of the probe-side holder 32, and S1 and 32 form a space S that is filled with the soft gel portion 33.

Figure 13:
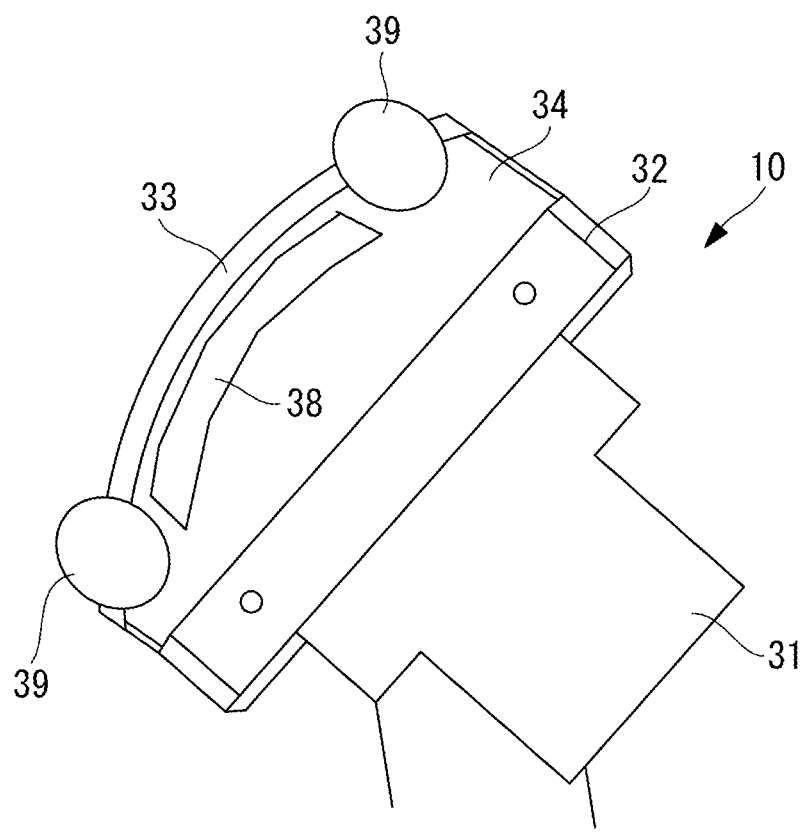
FIG. 13 is a schematic diagram illustrating a second magnet and a rolling roller provided at the inspecting portion according to the embodiment of the present disclosure.

The rotor disc-side holder 34 includes a second magnet (sticking portion) 38 that sticks to the disc surface 5a and ball rollers 39 as illustrated in FIG. 13. The second magnet 38 is embedded in the one end portion of the rotor disc-side holder 34. The ball rollers 35 are disposed to sandwich the second magnet 38 therebetween, with a part embedded in the one end portion of the rotor disc-side holder 34 and with another part projecting from the one end of the rotor disc-side holder 34. The ball rollers 39 smoothen relative movement of the rotor disc-side holder 34 and the disc surface 5a by coming into contact with the disc surface 5a.

The soft gel portion 33 is a member that keeps a predetermined shape in a state in which a pressing force does not act thereon and is deformed when the soft gel portion 33 is pressed. Also, the soft gel portion 33 is a member that suitably allows ultrasonic waves to pass therethrough. The space S is filled with the soft gel portion 33. One end portion of the soft gel portion 33 is formed into a shape in accordance with the curved form (the small diameter R, for example) of the disc surface 5a to which the ultrasonic inspection device 100 is attached. The one end portion of the soft gel portion 33 is disposed to further project toward the rotor disc 5 than the one end portion of the rotor disc-side holder 34. In this manner, the soft gel portion 33 is also pressed against the disc surface 5a by pressing the rotor disc-side holder 34 against the disc surface 5a. The soft gel portion 33 is deformed to come into close contact with the disc surface 5a due to the pressing force.

Figure 11:
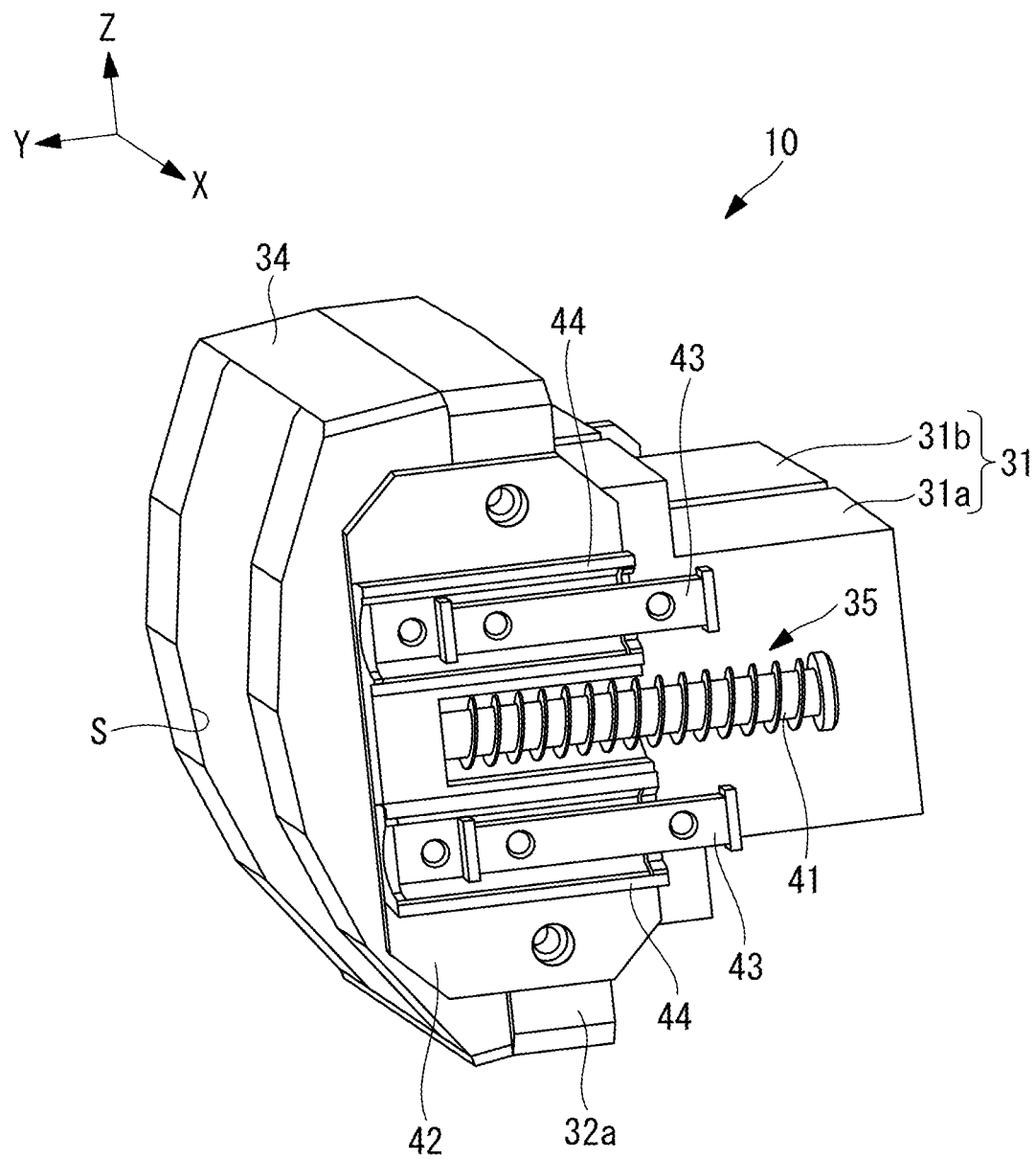
FIG. 11 is a perspective view of the inspecting portion according to the embodiment of the present disclosure and is a diagram in which the arm portion and an angle adjustment portion are omitted.

The biasing portion 35 includes a plate-shaped first bracket 40 secured to the securing arm 30, a spring 41 with the other end portion secured to the first bracket 40, and a plate-shaped second bracket 42 secured to the probe-side holder 32 as illustrated in FIGS. 9 and 11. One end portion of the spring 41 abuts on the second bracket 42. In this manner, a biasing force of the spring 41 is delivered to the probe-side holder 32 via the second bracket 42, and the probe-side holder 32 is thus biased toward the one end side (toward the rotor disc 5).

Also, a slider portion 43 is secured to the first bracket 40. In addition, a rail portion 44 is secured to the probe-side holder 32. The slider portion 43 and the rail portion 44 extend in the Y direction. The slider portion 43 and the rail portion 44 are configured to be engageable. Movement of the securing arm 30 and the probe-side holder 32 in the X direction and the Z direction is restricted through the engagement between the slider portion 43 and the rail portion 44.

Also, one end portion of the second bracket 42 projects beyond the one end portion of the probe-side holder 32. The projecting part of the second bracket 42 abuts on or goes close to an end surface of the rotor disc-side holder 34 in the X direction. Therefore, the second bracket 42 restricts relative movement of the probe-side holder 32 and the rotor disc-side holder 34 in the X direction.

Figure 10:
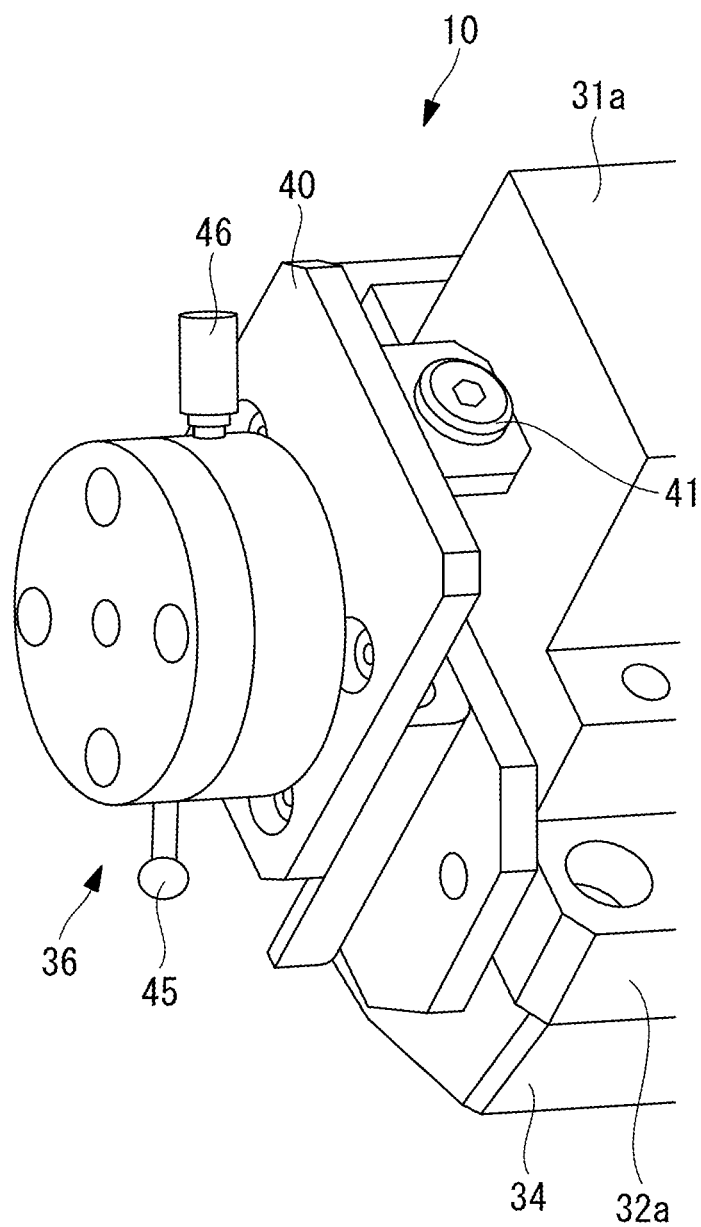
FIG. 10 is a perspective view of the inspecting portion according to the embodiment of the present disclosure and is a diagram in which an arm portion is emitted.

The angle adjustment portion 36 is provided between the probe-side holder 32 and the securing arm 30 as illustrated in FIG. 10. The angle adjustment portion 36 is adapted to be able to rotate the probe-side holder 32 about a shaft (not illustrated) extending along the central axis line C1 (see FIG. 6) relative to the securing arm 30. Therefore, it is possible to set the inspecting portion 10 at a desired angle by moving a lever 45 provided at the angle adjustment portion 36. Also, rotation of the angle adjustment portion 36 is restricted by fastening a rotation securing screw 46 provided at the securing arm 30 to cause a distal end of the rotation securing screw 46 formed of a rubber material and the shaft to abut on each other. It is thus possible to fix the angle of the inspecting portion 10.

[Inclination Adjustment. Mechanism]

Next, the inclination adjustment mechanism 50 will be described using FIGS. 14 to 17.

Figure 14:
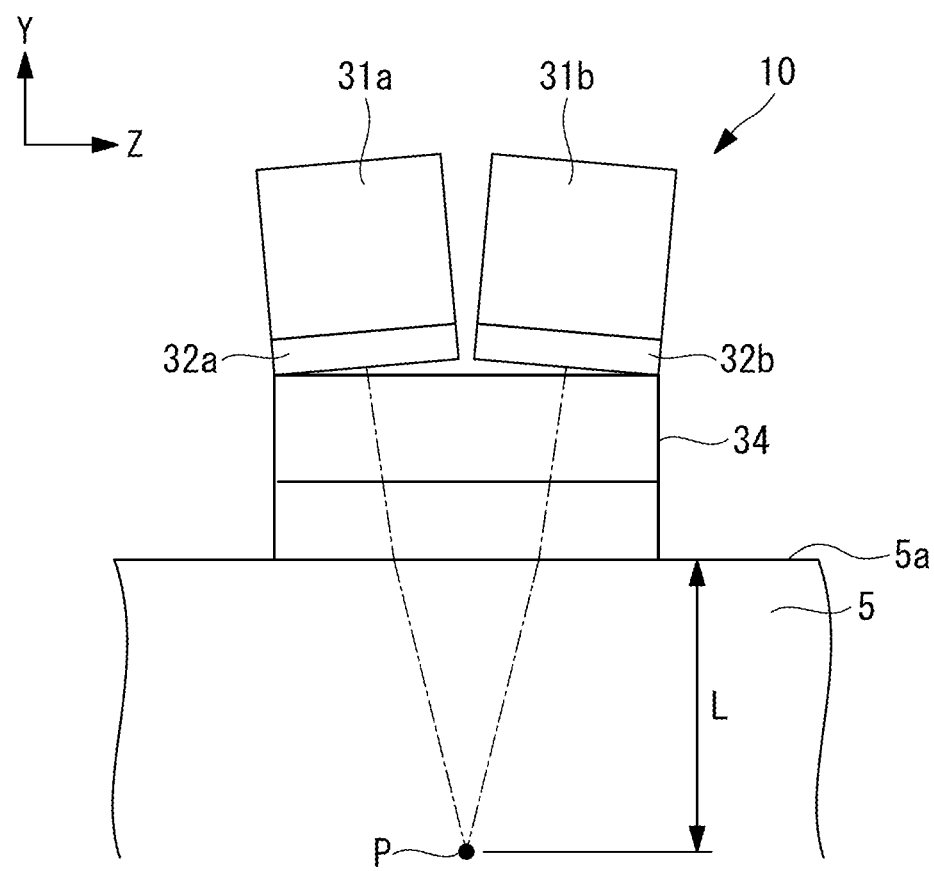
FIG. 14 is a schematic side view of the inspecting portion according to the embodiment of the present disclosure.

The inspecting portion 10 according to the present embodiment can cause the first probe-side holder 32a and the first, ultrasonic probe 31a to be inclined at a desired angle on the opposite side of the second probe-side holder 32b and the second ultrasonic probe 31b using the inclination adjustment mechanism (a first inclination means and a second inclination means) 50 as illustrated in FIG. 14. Also, it is possible to cause the second probe-side holder 32b and the second ultrasonic probe 31b to be inclined at a desired angle on the opposite side of the first probe-side holder 32a and the first ultrasonic probe 31a using the inclination adjustment mechanism 50.

The inclination adjustment mechanism 50 that causes the first probe-side holder 32a and the first ultrasonic probe 31a to be inclined and the inclination adjustment mechanism 50 that causes the second probe-side holder 32b and the second ultrasonic probe 31b to be inclined are symmetrically configured. Therefore, the inclination adjustment mechanism that causes the first probe-side holder 32a and the first ultrasonic probe 31a to be inclined will be described below, and description of the inclination adjustment mechanism 50 that causes the second probe-side holder 32b and the second ultrasonic probe 31b will be omitted.

Figure 15A:
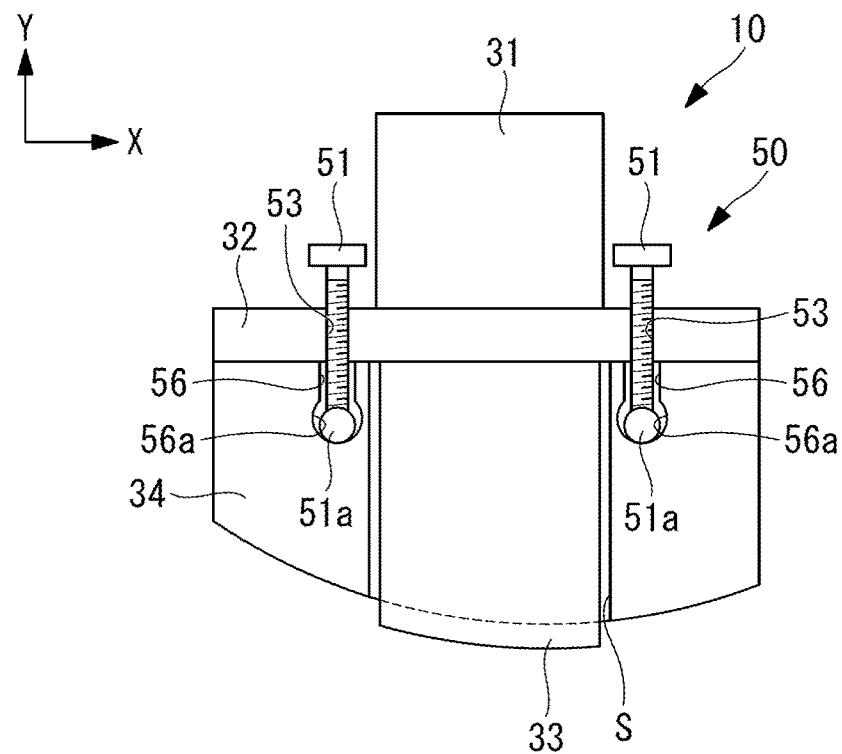
FIG. 15A is a schematic diagram illustrating an inclination adjustment mechanism according to the embodiment of the present disclosure.
Figure 15B:
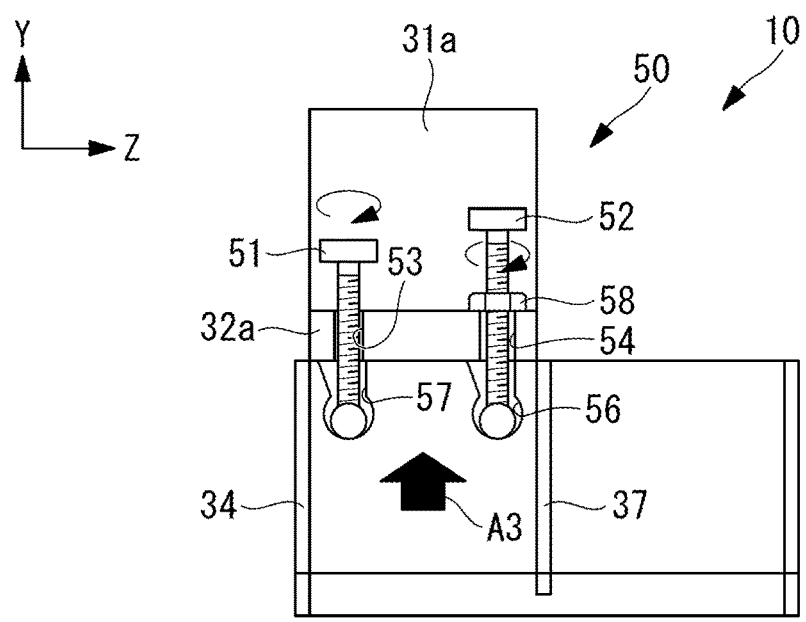
FIG. 15B is a schematic diagram illustrating the inclination adjustment mechanism according to the embodiment of the present disclosure.

The inclination adjustment mechanism 50 includes two outer screws 51 that penetrate through the first probe-side holder 32a and the rotor disc-side holder 34 and two inner screws 52 as illustrated in FIGS. 15A and 15B. The length of the inner screws 52 is longer than the length of the outer screws 51. Distal ends of the screws are provided with spherical portions 51a and 52a. The two outer screws 51 are disposed to sandwich the first ultrasonic probe 31a. Also, the two inner screws 52 are provided further inward than the outer screw 51 and are disposed to sandwich the first ultrasonic probe 31a.

Two outer screw holes 53 through which the outer screws 51 are inserted and two inner screw holes 54 through which the inner screws 52 are inserted are formed in the first probe-side holder 32a. Both the outer screw holes 53 and the inner screw holes 54 formed in the probe-side holder 32 penetrate through the probe-side holder 32. In the outer screw holes 53, female screws into which the outer screws 51 can be screwed are formed in inner circumferential surfaces. The inner screw holes 54 are formed to have a sufficiently larger diameter than the diameter of shaft portions of the inner screws 52. In other words, the inner screws 52 are not screwed into the inner screw holes 54.

Two outer screw holes 56 into which the outer screws 51 are inserted and two inner screw holes 57 into which the inner screws 52 are inserted are formed in the rotor disc-side holder 34. Each of the inner screw holes 57 and the outer screw holes 56 formed in the rotor disc-side holder 34 has a recessed portion shape with a bottom. Spherical spaces 56a and 57a into which the spherical portions 51a and 52a are inserted are formed at the bottom portions of the outer screw holes 56 and the inner screw holes 57. Also, inner circumferential surfaces of the outer screw holes 56 and the inner screw holes 57 are inclined to be separated from the second probe-side holder 32b and the second ultrasonic probe 31b such that the inner screws 52 and the outer screws 51 can be inclined.

Figure 15C:
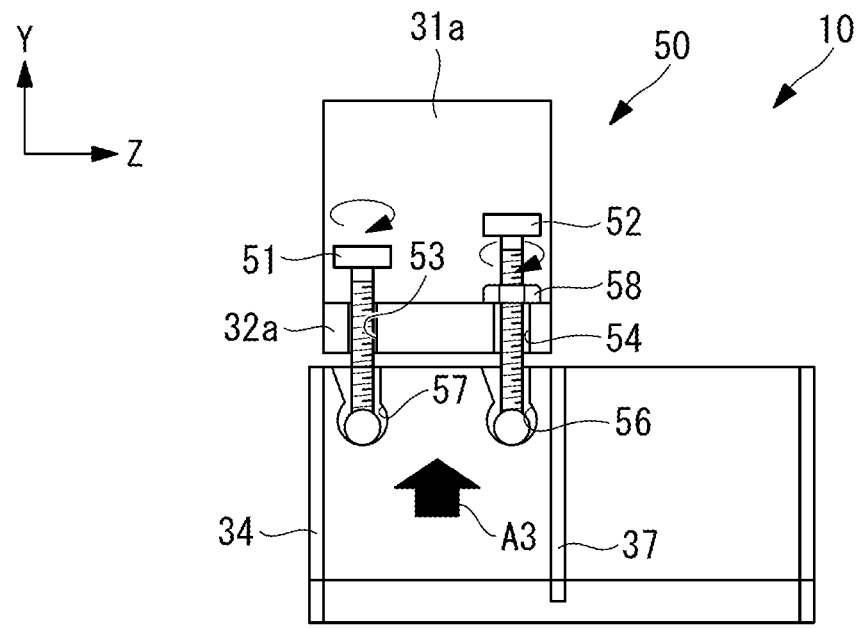
FIG. 15C is a schematic diagram illustrating the inclination adjustment mechanism according to the embodiment of the present disclosure.

Also, nuts 58 are screwed onto the inner screws 52 on the other side beyond the first probe-side holder 32a. The positions where the nuts are screwed differ depending on applications. In a case in which the nuts 58 are screwed to come into contact with the first probe-side holder 32a as illustrated in FIG. 15B and the outer screws 51 and the inner screws 52 are caused to rotate at the same time as illustrated by the arrows in FIG. 15B, for example, the first probe-side holder 32a and the first ultrasonic probe 31a are separated from the rotor disc-side holder 34 with a parallel state maintained as illustrated in FIG. 15C.

Figure 15D:
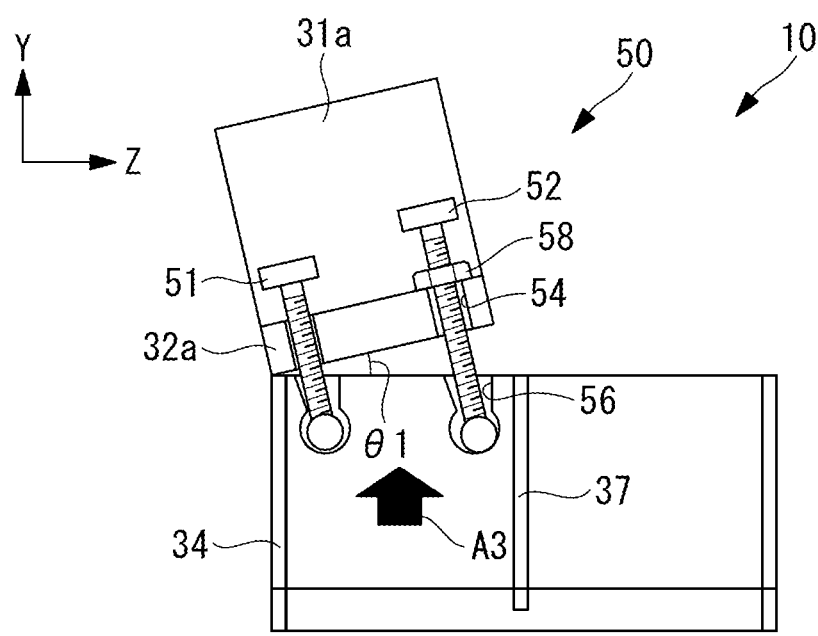
FIG. 15D is a schematic diagram illustrating the inclination adjustment mechanism according to the embodiment of the present disclosure.

On the other hand, in a case in which the nuts 58 are screwed on the proximal end side of the inner screws 52 as illustrated in FIG. 15D, only the inner side of the first probe-side holder 32a and the first ultrasonic probe 31a moves to the other side due to the pressing force (see the arrow A3) of the soft gel. In this manner, the first probe-side holder 32a and the first ultrasonic probe 31a are inclined on the opposite side of the second probe-side holder 32b and the second ultrasonic probe 31b. The first probe-side holder 32a and the first ultrasonic probe 31a are stopped at the position where the nuts 58 and the first probe-side holder 32a come into contact with each other, and it is thus possible to set an inclination angle θ1 of the first probe-side holder 32a and the first ultrasonic probe 31a to be a desired angle by adjusting the position where the nuts 58 are screwed. The inclination angle θ1 is an angle formed by the one end surface of the first probe-side holder 32a and the other end surface of the rotor disc-side holder 34.

Also, in a case in which a nut (not illustrated) is further provided between the first probe-side holder 32a and the rotor disc-side holder 34 and the nut is caused to come into contact with the one end surface of the first probe-side holder 32a, it is possible to support the first probe-side holder 32a and the first ultrasonic probe 31a with the nut and thereby to secure the first probe-side holder 32a and the first ultrasonic probe 31a at the desired inclination angle θ1 regardless of the pressurizing force of the soft gel.

[Modification of Inclination Adjustment Mechanism 50]

Figure 16A:
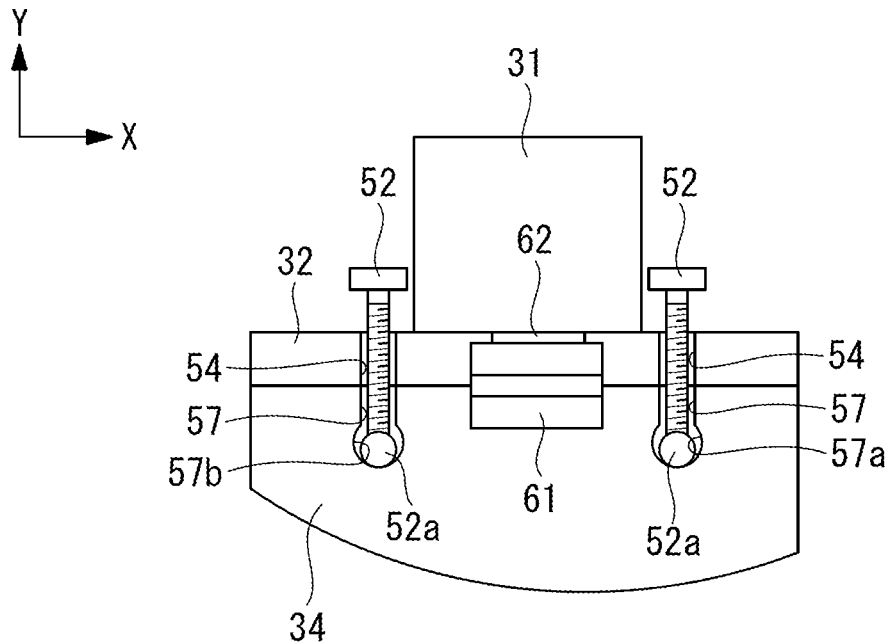
FIG. 16A is a schematic diagram illustrating a modification of FIG. 15A.
Figure 16B:
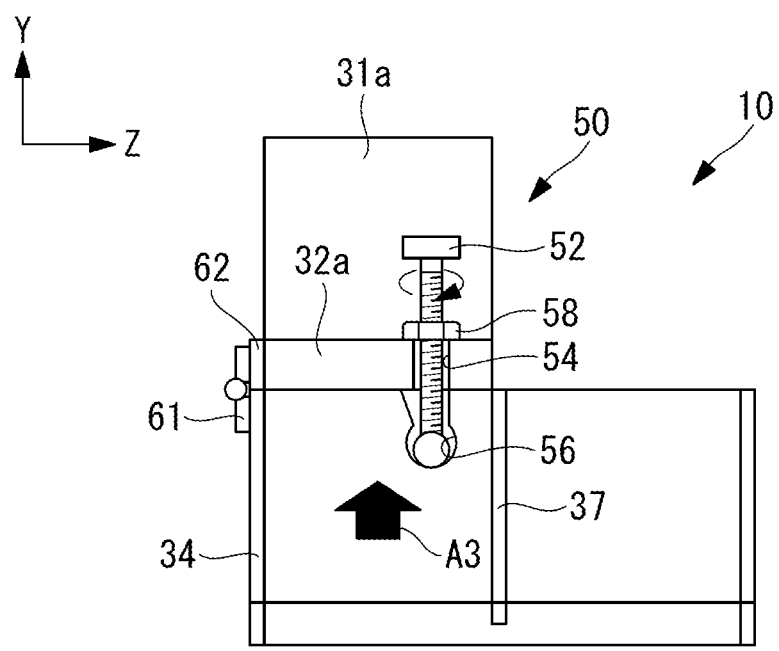
FIG. 16B is a schematic diagram illustrating the modification of FIG. 15A.
Figure 16C:
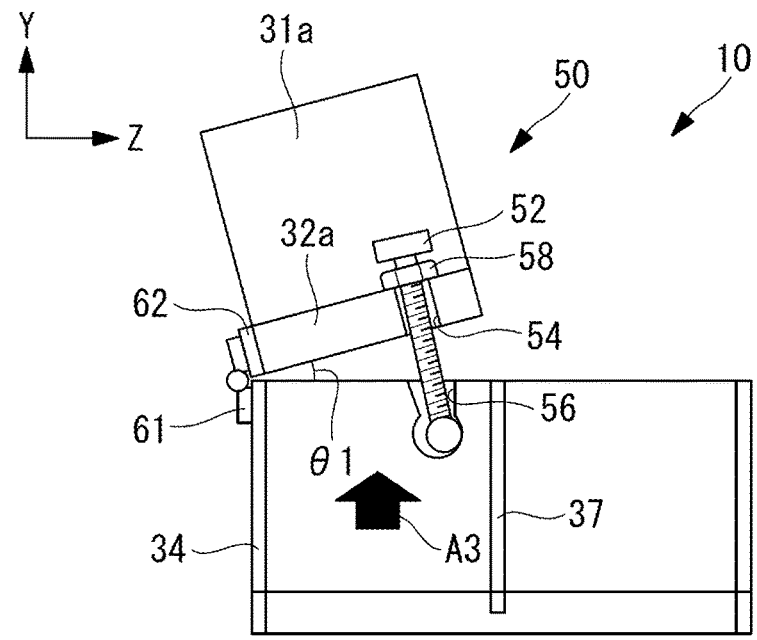
FIG. 16C is a schematic diagram illustrating the modification of FIG. 15A.

Note that the inclination adjustment mechanism 50 may be configured as illustrated in FIGS. 16A to 16C.

The configuration of the modification is different from the configuration illustrated in FIGS. 15A to 15D in that a hinge 61 and a tension spring 62 are provided instead of the outer screws 51. Since the configuration of the inner screws 52 is substantially the same as the configuration illustrated in FIGS. 15A to 15D, description will be omitted. The hinge 61 is secured to the outside of the rotor disc-side holder 34 in the Z direction. Also, the hinge 61 is secured to the outside of the first probe-side holder 32a in the Z direction via the tension spring 62. The tension spring 62 biases the first probe-side holder 32a in the direction of the rotor disc-side holder 34.

With such a configuration, only the inner side of the first probe-side holder 32a and the first ultrasonic probe 31a also moves to the other side due to the pressing force (see the arrow A3) of the soft gel in a case in which the nuts 58 are screwed onto the proximal end side of the inner screws 52 as illustrated in FIG. 16C. In this manner, the first probe-side holder 32a and the first ultrasonic probe 31a are inclined on the opposite side of the second probe-side holder 32b and the second ultrasonic probe 31b. Since the first probe-side holder 32a and the first ultrasonic probe 31a are stopped at the position where the nuts 58 and the first probe-side holder 32a come into contact with each other, it is possible to set the inclination angle θ1 of the first probe-side holder 32a and the first ultrasonic probe 31a to be a desired angle through adjustment of the position where the nuts 58 are screwed.

[Inspection Method]

Next, a method for inspecting the rotor disc 5 of the steam turbine 1 using the ultrasonic inspection device 10G according to the present embodiment will be described in detail using the flowchart in FIG. 18.

First, as illustrated in Step S1, the ultrasonic probe 31 is secured to the probe-side holder 32 (see FIGS. 9 and 11).

Next, as illustrated in Step S2, the angle θ of the steering wheel 13 is adjusted in accordance with the rotation radius of the steering wheel 13. At this time, an original angle θ (the angle θ of the steering wheel 13 when the inspection of the rotor disc 5 is started using the ultrasonic inspection device 100) of the steering wheel 13 is adjusted such that the ultrasonic inspection device 100 moves and rotates in accordance with the rotation radius r. Specifically, the angle θ is set to satisfy Equation (1) below.

$$\theta = L/r \tag{1}$$

where L denotes an arc length (the separation distance between the steering wheel 13 and the drive wheel 12), and r denotes a rotation radius (the distance from the center of the rotor disc 5 to the steering wheel 13).

Next, as illustrated in Step S3, the ultrasonic inspection device 100 is mounted on the curved surface of the disc surface 5a of the rotor disc 5. Specifically, the ultrasonic probe 31 is held on the disc surface 5a by causing each first magnet 11 to stick to the curved surface of the disc surface 5a as illustrated in FIG. 7 (holding process). At this time, it is possible to suitably cause the first magnets 11 to stick to the disc surface 5a by setting the projecting length of each stroke control device 18 to be the length in accordance with the curved surface as described above. The steering wheel 13, the drive wheel 12, and the inspecting portion 10 (specifically, the probe-side holder 32) are mounted on the disc surface 5a by causing each first magnet 11 to stick to the disc surface 5a. Also, the hook portion provided at the distal end of each stroke sensor 14 is hooked on the shoulder portion 5b of the rotor disc 5. At this time, a value of the distance between the ultrasonic inspection device 100 and the shoulder portion 5b may be stored as an initial value in the storage portion 21.

Note that the surface on which the ultrasonic inspection device 100 is mounted is not limited to the curved surface of the disc surface 5a. The ultrasonic inspection device 100 may be mounted on a flat surface of the disc surface 5a.

Next, as illustrated in Step S4, the inspecting portion 10 is manually rotated in the roll direction (see the arrow A2 in FIG. 6) to adjust an incident angle of the ultrasonic wave transmitted from the ultrasonic probe 31 of the inspecting portion 10. At this time, the shape echo of the blade groove portion 6 is checked with the inspecting portion 10 rotated in the roll direction, and the orientation of the inspecting portion 10 is adjusted such that the incident angle of the ultrasonic wave transmitted from the ultrasonic probe 31 becomes an appropriate angle. Then, the inspecting portion 10 is secured such that the orientation of the inspecting portion 10 becomes an appropriate orientation.

Next, as illustrated in Step S5, the ultrasonic inspection device 100 is caused to travel on the disc surface 5a of the rotor disc 5 (moving process). At this time, the ultrasonic inspection device 100 travels on the disc surface 5a in the circumferential direction as described above. At this time, the ultrasonic inspection device 100 detects the self-position using the self-position detecting portion 23 (position detecting process), adjusts the moving direction using the steering wheel control portion 22 (adjustment process), and moving in the circumferential direction with the predetermined radial position maintained (control process). Also, the ultrasonic inspection device 100 transmits an ultrasonic wave from the ultrasonic probe 31 to the rotor disc 5 while traveling (ultrasonic wave transmission process).

The ultrasonic inspection device 100 may travel by causing the drive wheel 12 to rotate using a motor or the like. In other words, the ultrasonic inspection device 100 may travel by itself. Also, the ultrasonic inspection device 100 may perform the inspection by manually pressing the probe-side holder 32 and the like in the rotation direction. In other words, the ultrasonic inspection device 100 may be caused to perform semi-automatic scanning.

Next, as illustrated in Step S6, inspection data is recorded (recording process). The inspection data may be recorded for the entire region of the rotor disc 5 in the circumferential direction or may be recorded for a part of the rotor disc 5. Specifically, the ultrasonic inspection device 100 detects the self-position in the circumferential direction using the self-position detecting portion 23 and records the inspection data at predetermined pitches while moving in the circumferential direction with the predetermined radial position maintained using the steering wheel control portion 22.

Next, as illustrated in Step S7, inspection 3D data is generated. Specifically, the inspection 3D data is generated by merging the inspection data on a plurality of sections recorded in Step S6 with 3D-CAD data. The 3D-CAD data may be stored in the storage portion 21.

Next, as illustrated in Step S3, the inspection 3D data is analyzed. Specifically, scratching echo identification is performed by overlapping and comparing the inspection 3D data generated in Step S7 with the 3D-CAD data. In other words, the shape echo and noise are identified. In this manner, whether or not any damage has occurred in the rotor disc 5 is inspected (determination process). Note that the 3D-CAD data as a comparison target is data on the rotor disc 5 before being damaged and may be 3D-CAD data at the time of design, for example.

Note that the scratching echo identification may be performed on the basis of operator's decision. Also, the control device 15 may be provided with an identification portion to identify a scratching echo, and the scratching echo may be identified by the identification portion. Alternatively, AI that has performed learning on the basis of accumulated inspection 3D data may perform the identification.

According to the present embodiment, the following effects and advantages are achieved.

In the present embodiment, the ultrasonic inspection device 100 is movably held relative to the disc surface 5a of the rotor disc 5, and the ultrasonic inspection device 100 moves using the drive wheel 12. In this manner, the ultrasonic inspection device 100 travels on the disc surface 5a of the rotor disc 5. Also, in the present embodiment, the control device 15 controls the steering portion such that the radial position of the ultrasonic probe 31 (X direction) becomes the predetermined position. It is thus possible to set the radial position of the ultrasonic probe 31 to be the predetermined position when the ultrasonic probe 31 moves in the direction (Z direction) that intersects the radial direction of the rotor disc 5. In other words, it is possible to cause the ultrasonic probe 31 to move in the circumferential direction with the predetermined radial position maintained.

In this manner, according to the present embodiment, the ultrasonic inspection device 100 can travel in the circumferential direction on the disc surface 5*a* of the rotor disc 5. It is thus possible to reduce the size corresponding to non-provision of a carriage and the like as compared with a configuration in which the radial position of the ultrasonic probe 31 is fixed, by providing the carriage and the like secured to a rotor shaft 4, for example. Therefore, even in a case of the rotor disc 5 at a short distance from an adjacent rotor disc 5 like a large-sized rotor disc 5, for example, it is possible to curb an interference with the adjacent rotor disc 5 and to easily mount the ultrasonic inspection device 100 on the disc surface 5*a* of the rotor disc 5.

In the present embodiment, the ultrasonic inspection device 100 includes a motor that drives the drive wheel 12. There is thus no need to obtain power from the outside, and the ultrasonic inspection device 100 can thus travel by itself on the disc surface 5*a* of the rotor disc 5. Therefore, it is possible to simplify the structure as compared with a structure in which the ultrasonic inspection device 100 obtains power from the outside.

Also, since the ultrasonic inspection device 100 travels by itself, there is no need for an operator to manually move the ultrasonic inspection device 100, and it is also possible to apply the ultrasonic inspection device 100 to inspection of a large-sized rotor disc 5 that it is difficult for the operator or the like to reach with his/her hands.

In the present embodiment, the ultrasonic probe 31 is held relative to the disc surface 5*a* such that the ultrasonic probe 31 does not come into contact with the disc surface 5*a*, using the first magnets 11. It is thus possible to reduce a traveling resistance when the ultrasonic inspection device 100 moves.

In the present embodiment, the encoder that detects the distance of movement is included. It is thus possible to grasp the position of the ultrasonic inspection device 100 in the circumferential direction. Therefore, it is possible to associate the inspection result of the ultrasonic probe 31 with the position in the circumferential direction. Accordingly, it is possible to specify the position of a damage that has occurred in the rotor disc 5.

In the present embodiment, the soft gel portion 33 that is deformed by being pressed against the rotor disc 5 is provided between the ultrasonic probe 31 and the rotor disc 5. In this manner, the soft gel portion 33 is deformed in accordance with the surface of the rotor disc 5 by pressing the soft gel portion 33 against the rotor disc 5, and it is thus possible to remove an air layer on the surface of the rotor disc 5. It is possible to remove the air layer between the ultrasonic probe 31 and the rotor disc 5 and thereby to suitably deliver the ultrasonic wave from the ultrasonic probe 31 to the rotor disc 5. Therefore, it is also possible to suitably perform inspection on the rotor disc 5 with the curved disc surface 5*a* like a large-sized rotor disc 5, for example, by causing the soft gel portion 33 to be deformed.

Moreover, in the present embodiment, the soft gel portion 33 changes in accordance with the curved form of the disc surface 5*a*, and it is thus possible to remove the air layer regardless of the curved form. Therefore, if curved surfaces of flange portions with similar shapes in a vertical sectional view are present in the disc surface in a case in which flaw detection is performed on a plurality of disc blade groove in the same turbine rotor, for example, the curved form (large diameter R) of the disc surface 5*a* that is an inspection target changes depending on the diameter dimension at the position on the disc where the probe is placed. The soft gel portion 33 is deformed in accordance with the change in curved form of the disc surface 5*a* in such a case as well. Therefore, it is possible to suitably perform the inspection while causing the same ultrasonic inspection device 100 to move without changing the probe and the holder for the flange portions with the same shape even if the disc diameters are different.

Also, in the present embodiment, the probe-side holder 32 is biased toward the rotor disc 5 by the biasing portion 35. It is thus possible to press the soft gel portion 33 against the rotor disc 5 via the probe-side holder 32. Therefore, it is possible to more suitably press the soft gel portion 33 against the rotor disc 5. Accordingly, it is possible to more suitably cause the soft gel portion 33 to be deformed in accordance with the disc surface 5*a* of the rotor disc 5 and to remove the air layer.

In the present embodiment, the angle adjustment portion 36 that changes the angle of the ultrasonic probe 31 relative to the disc surface 5*a* of the rotor disc 5 is included. It is thus possible to appropriately transmit the ultrasonic wave to the target location (inspection target location) through adjustment of the angle of the ultrasonic probe 31.

In the present embodiment, the inclination adjustment mechanism 50 that causes the first ultrasonic probe 31*a* to be inclined on the opposite side of the second ultrasonic probe 31*b* and the inclination adjustment mechanism 50 that causes the second ultrasonic probe 31*b* to be inclined on the opposite side of the first ultrasonic probe 31*a* are included. In this manner, it is possible to cause the ultrasonic wave transmitted from the first ultrasonic probe 31*a* and the ultrasonic wave transmitted from the second ultrasonic probe 31*b* to be focused inside the rotor disc 5 by transmitting the ultrasonic waves from the first ultrasonic probe 31*a* and the second ultrasonic probe 31*b* in a state in which the first ultrasonic probe 31*a* and the second ultrasonic probe 31*b* are inclined. Also, it is possible to adjust a depth L (the distance from the disc surface 5*a* of the rotor disc 5; see FIG. 13) of the focusing position of the ultrasonic waves through adjustment of the inclination angle θ1. Therefore, even for a turbine in which the disc surface 5*a* is curved like a large-sized rotor disc 5, for example, it is possible to cause the ultrasonic waves to be focused at a desired position through the adjustment of the inclination angle θ1 of the first ultrasonic probe 31*a* and the second ultrasonic probe 31*b* in accordance with the shape of the curved portion. Accordingly, there is no need to prepare an element or the like with a refraction angle calculated in accordance with the shape (curvature) of the curved portion, and it is thus possible to simply perform the inspection.

Figure 17:
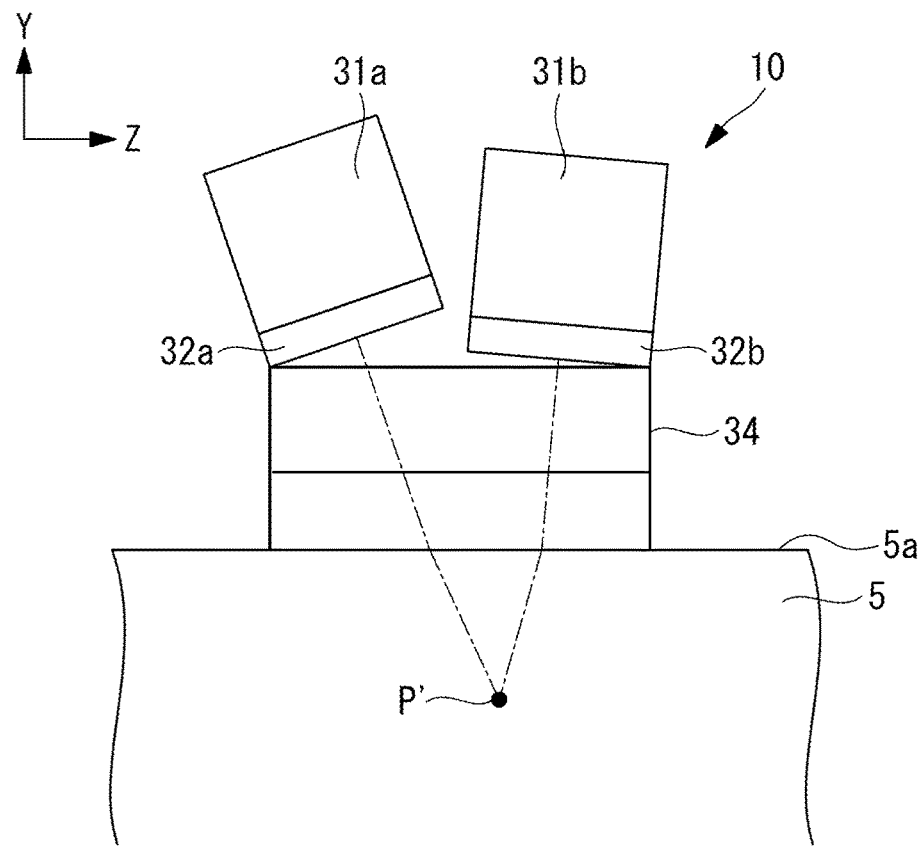
FIG. 17 is a schematic side view of the inspecting portion according to the embodiment of the present disclosure.

The inclination adjustment mechanism 50 can set the inclination angle θ1 to a desired angle. Also, it is possible to place the focusing position of the ultrasonic waves on the first ultrasonic probe 31*a* or on the second ultrasonic probe 31*b* by setting the inclination angle of the first ultrasonic probe 31*a* and the inclination angle of the second ultrasonic probe 31*b* to be different angles. In other words, in a case in which the inclination angle of the first ultrasonic probe 31*a* is set to be larger than the inclination angle of the second ultrasonic probe 31*b*, a focusing position P' of the ultrasonic waves is located on the second ultrasonic probe 31*b* as illustrated in FIG. 17. On the contrary, in a case in which the inclination angle of the second ultrasonic probe 31*b* is set to be larger than the inclination angle of the first ultrasonic probe 31*a*, the focusing position of the ultrasonic waves is placed on the first ultrasonic probe 31*a*. It is thus possible to cause the ultrasonic waves to converge in a wider range. In particular, it is possible to cause the ultrasonic waves to converge in the direction in which the blade groove portion 6 extends without using a wedge or the like for the skewed-type blade groove portion 6 as illustrated in FIG. 3 and thereby to simply perform the inspection.

Note that the present disclosure is not limited to each of the aforementioned embodiments and can be appropriately deformed without departing from the gist.

For example, the ultrasonic inspection device 100 may further include an inertial measurement device, a laser range finder, a sonar, and the like. It is possible to improve control accuracy of the ultrasonic inspection device 100 by providing such instruments.

Also, surfaces of the first magnets 11 may be covered with a low-friction material such as a gel, and the low-friction material may be brought into contact with the disc surface 5a. It is possible to reduce the traveling resistance by such a method as well.

Also, although the example in which the ultrasonic inspection device 100 is secured to the curved surface of the disc surface 5a of the rotor disc 5 has been described in the aforementioned embodiment, the present disclosure is not limited thereto. The ultrasonic inspection device 100 may be secured to a flat surface of the disc surface 5a of the rotor disc 5.

REFERENCE SIGNS LIST

1 Steam turbine
2 Turbine rotor
3 Rotor blade
4 Rotor shaft
5 Rotor disc
5a Disc surface
6 Blade groove portion
10 Inspecting portion
11 First magnet (holding portion)
12 Drive wheel (moving portion)
13 Steering wheel (adjustment portion)
14 Stroke sensor (position detecting portion)
15 Control device (control portion)
16 Drive wheel support portion
16a Facing surface
17 Steering wheel support portion
17a Facing surface
13 Stroke control device
21 Storage portion
22 Steering wheel control portion
23 Self-position detecting portion (moving distance detecting portion)
24 Damage grasping portion
30 Securing arm
31 Ultrasonic probe
31a First ultrasonic probe
31b Second ultrasonic probe
32 Probe-side holder
32a First probe-side holder
32b Second probe-side holder
33 Soft gel portion
34 Rotor disc-side holder
35 Biasing portion
36 Angle adjustment portion
37 Shielding plate
38 Second magnet
39 Bali roller
40 First bracket
41 Spring
42 Second bracket
43 Slider portion
44 Rail portion
45 Lever
46 Rotation securing screw
50 Inclination adjustment mechanism (first inclination means, second inclination means)
51 Outer screw
51a Spherical portion
52a Spherical portion
52 Inner screw
53 Outer screw hole
54 Inner screw hole
56 Outer screw hole
56a Spherical space
57a Spherical space
57 Inner screw hole
58 Nut
61 Hinge
62 Tension spring
100 Ultrasonic inspection device

The invention claimed is:

1. An ultrasonic inspection device for ultrasonically inspecting a rotor disc, the device comprising:
    an ultrasonic probe that transmits an ultrasonic wave to a disc surface of the rotor disc;
    a holding portion that movably holds the ultrasonic probe relative to the disc surface of the rotor disc;
    a moving portion that causes the ultrasonic probe to move in a direction that intersects a radial direction of the rotor disc;
    an adjustment portion that adjusts a moving direction of the moving portion;
    a position detecting portion that detects a radial position of the ultrasonic probe being held relative to the disc surface; and
    a control portion that controls the adjustment portion on the basis of information detected by the position detecting portion such that the radial position of the ultrasonic probe falls within a predetermined range.

2. The ultrasonic inspection device according to claim 1, further comprising:
    a drive portion that drives the moving portion.

3. The ultrasonic inspection device according to claim 1, wherein the holding portion includes a magnet that sticks to the disc surface, and
    the magnet is separated from the disc surface.

4. The ultrasonic inspection device according to claim 1, further comprising:
    a moving distance detecting portion that detects a distance of the movement caused by the moving portion.

5. An ultrasonic inspection device for ultrasonically inspecting a rotor disc, the device comprising:
    an ultrasonic probe that transmits an ultrasonic wave to a disc surface of the rotor disc;
    a probe-side holder to which the ultrasonic probe is secured;
    a deformation portion that is provided between the ultrasonic probe and the disc surface, allows the ultrasonic wave to pass therethrough, and is deformable by being pressed against the disc surface;
    a rotor disc-side holder that includes a sticking portion sticking to the disc surface, is provided closer to the rotor disc than the probe-side holder, and holds the deformation portion; and a biasing portion that biases the probe-side holder toward the rotor disc.

6. The ultrasonic inspection device according to claim 5, further comprising:
an angle adjustment portion that changes an angle of the ultrasonic probe relative to the disc surface.

7. An ultrasonic inspection device for ultrasonically inspecting a rotor disc, the device comprising:
a first ultrasonic probe that transmits an ultrasonic wave to a disc surface of the rotor disc;
a second ultrasonic probe that transmits the ultrasonic wave to the disc surface and is provided to be adjacent to the first ultrasonic probe;
a first inclination means that causes the first ultrasonic probe to be inclined on an opposite side of the second ultrasonic probe; and
a second inclination means that causes the second ultrasonic probe to be inclined on an opposite side of the first ultrasonic probe.

8. An inspection method for ultrasonically inspecting a rotor disc using the ultrasonic inspection device according to claim 1, the method comprising:
an ultrasonic wave transmission process of transmitting an ultrasonic wave from the ultrasonic probe to the disc surface of the rotor disc;
a holding process of movably holding the ultrasonic probe relative to the disc surface, by the holding portion;
a moving process of causing the ultrasonic probe to move in a direction that intersects the radial direction of the rotor disc, by the moving portion;
an adjustment process of adjusting a moving direction of the moving portion, by the adjustment portion;
a position detecting process of detecting a radial position of the ultrasonic probe being held relative to the disc surface, by the position detecting portion; and
a control process of controlling the adjustment portion on the basis of information detected in the position detecting process, by the control portion such that the radial position of the ultrasonic probe falls within a predetermined range.

9. The inspection method according to claim 8, wherein in the holding process, the ultrasonic probe is held relative to a curved surface of the disc surface.

10. The inspection method according to claim 8, further comprising:
a recording process of recording inspection data obtained by the ultrasonic wave transmitted from the ultrasonic probe; and
a determination process of determining whether or not the rotor disc has been damaged on the basis of the inspection data recorded in the recording process.

11. The ultrasonic inspection device according to claim 2, wherein the holding portion includes a magnet that sticks to the disc surface, and
the magnet is separated from the disc surface.

12. The ultrasonic inspection device according to claim 2, further comprising:
a moving distance detecting portion that detects a distance of the movement caused by the moving portion.

13. The ultrasonic inspection device according to claim 3, further comprising:
a moving distance detecting portion that detects a distance of the movement caused by the moving portion.

14. An inspection method for ultrasonically inspecting a rotor disc using the ultrasonic inspection device according to claim 2, the method comprising:
an ultrasonic wave transmission process of transmitting an ultrasonic wave from the ultrasonic probe to the disc surface of the rotor disc;
a holding process of movably holding the ultrasonic probe relative to the disc surface, by the holding portion;
a moving process of causing the ultrasonic probe to move in a direction that intersects the radial direction of the rotor disc, by the moving portion;
an adjustment process of adjusting a moving direction of the moving portion, by the adjustment portion;
a position detecting process of detecting a radial position of the ultrasonic probe being held relative to the disc surface, by the position detecting portion; and
a control process of controlling the adjustment portion on the basis of information detected in the position detecting process, by the control portion such that the radial position of the ultrasonic probe falls within a predetermined range.

15. An inspection method for ultrasonically inspecting a rotor disc using the ultrasonic inspection device according to claim 3, the method comprising:
an ultrasonic wave transmission process of transmitting an ultrasonic wave from the ultrasonic probe to the disc surface of the rotor disc;
a holding process of movably holding the ultrasonic probe relative to the disc surface, by the holding portion;
a moving process of causing the ultrasonic probe to move in a direction that intersects the radial direction of the rotor disc, by the moving portion;
an adjustment process of adjusting a moving direction of the moving portion, by the adjustment portion;
a position detecting process of detecting a radial position of the ultrasonic probe being held relative to the disc surface, by the position detecting portion; and
a control process of controlling the adjustment portion on the basis of information detected in the position detecting process, by the control portion such that the radial position of the ultrasonic probe falls within a predetermined range.

16. An inspection method for ultrasonically inspecting a rotor disc using the ultrasonic inspection device according to claim 4, the method comprising:
an ultrasonic wave transmission process of transmitting an ultrasonic wave from the ultrasonic probe to the disc surface of the rotor disc;
a holding process of movably holding the ultrasonic probe relative to the disc surface, by the holding portion;
a moving process of causing the ultrasonic probe to move in a direction that intersects the radial direction of the rotor disc, by the moving portion;
an adjustment process of adjusting a moving direction of the moving portion, by the adjustment portion;
a position detecting process of detecting a radial position of the ultrasonic probe being held relative to the disc surface, by the position detecting portion; and
a control process of controlling the adjustment portion on the basis of information detected in the position detecting process, by the control portion such that the radial position of the ultrasonic probe falls within a predetermined range.

17. The inspection method according to claim 9, further comprising:
a recording process of recording inspection data obtained by the ultrasonic wave transmitted from the ultrasonic probe; and a determination process of determining whether or not the rotor disc has been damaged on the basis of the inspection data recorded in the recording process.

* * * * *